United States Patent
Kim et al.

(10) Patent No.: US 10,484,127 B2
(45) Date of Patent: Nov. 19, 2019

(54) METHOD AND APPARATUS FOR TRANCEIVING COMMON CONTROL MESSAGE IN WIRELESS ACCESS SYSTEM SUPPORTING NARROW BAND INTERNET OF THINGS

(71) Applicant: LG ELECTRONICS INC., Seoul (KR)

(72) Inventors: Bonghoe Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 110 days.

(21) Appl. No.: 15/545,458

(22) PCT Filed: Jan. 29, 2016

(86) PCT No.: PCT/KR2016/001028
§ 371 (c)(1),
(2) Date: Jul. 21, 2017

(87) PCT Pub. No.: WO2016/122268
PCT Pub. Date: Aug. 4, 2016

(65) Prior Publication Data
US 2018/0006763 A1 Jan. 4, 2018

Related U.S. Application Data
(60) Provisional application No. 62/109,615, filed on Jan. 30, 2015.

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0053* (2013.01); *H04L 5/0057* (2013.01);
(Continued)

(58) Field of Classification Search
CPC ....... H04L 1/0026; H04L 1/08; H04L 5/0057; H04L 1/0025; H04L 5/00; H04L 5/0007;
(Continued)

(56) References Cited

U.S. PATENT DOCUMENTS 9,237,522 B2 * 1/2016 Golitschek Edler Von Elbwart ............ H04W 52/0216
9,485,006 B2 * 11/2016 Awad ................ H04B 7/15542
(Continued)

FOREIGN PATENT DOCUMENTS

WO WO 2013/129881 A1 9/2013

OTHER PUBLICATIONS

Ericsson, "Common control messages for MTC," R1-143789, 3GPP TSG-RAN WG1 Meeting #78bis, Ljubljana, Slovenia, Oct. 6-10, 2014 (downloaded on Sep. 27, 2014), pp. 1-6.
(Continued)

*Primary Examiner* — Steven H Nguyen
(74) *Attorney, Agent, or Firm* — Birch, Stewart, Kolasch & Birch, LLP

(57) ABSTRACT

Provided are methods for repeatedly transceiving a common control message for a machine-type communication (MTC) terminal in a wireless access system supporting MTC, and apparatuses supporting the methods. A method for receiving a common control message for an MTC terminal in a wireless access system supporting MTC according to one embodiment of the present invention may comprise the steps of: receiving a channel status information reference signal (CSI-RS); and receiving a common control message from a subframe in which the CSI-RS is received. Here, the com-
(Continued)

mon control message can be configured so as to be repeatedly transmitted from a previously configured number of subframes comprising the subframe.

8 Claims, 16 Drawing Sheets

(51) Int. Cl.
  *H04W 72/04* (2009.01)
  *H04W 4/70* (2018.01)
  *H04L 1/08* (2006.01)
(52) U.S. Cl.
  CPC ....... *H04W 72/0413* (2013.01); *H04L 1/0025* (2013.01); *H04L 1/08* (2013.01); *H04L 5/0007* (2013.01); *H04W 4/70* (2018.02); *H04W 72/0446* (2013.01)
(58) Field of Classification Search
  CPC ............ H04L 5/0053; H04W 72/0413; H04W 72/0446; H04W 4/005; H04W 4/70
  See application file for complete search history.

(56) References Cited

U.S. PATENT DOCUMENTS

| | | | | |
|---|---|---|---|---|
| 2008/0192847 | A1* | 8/2008 | Classon | H04L 5/0007 375/260 |
| 2012/0015661 | A1* | 1/2012 | Awad | H04B 7/15542 455/445 |
| 2012/0069764 | A1* | 3/2012 | Classon | H04L 5/0007 370/252 |
| 2012/0294248 | A1* | 11/2012 | Seo | H04W 24/00 370/329 |
| 2013/0039188 | A1* | 2/2013 | Larsson | H04L 1/0039 370/241 |
| 2013/0089067 | A1* | 4/2013 | Ji | H04W 56/00 370/330 |
| 2014/0254452 | A1* | 9/2014 | Golitschek Edler Von Elbwart | H04W 52/0216 370/311 |
| 2014/0328303 | A1* | 11/2014 | Jamadagni | H04W 4/70 370/329 |
| 2015/0256403 | A1* | 9/2015 | Li | H04W 4/70 370/235 |
| 2016/0081084 | A1* | 3/2016 | Blankenship | H04W 4/70 370/329 |

OTHER PUBLICATIONS

Intel Corporation, "Common control message enhancement for MTC," R1-145215, 3GPP TSG RAN WG1 Meeting #79, San Francisco, USA, Nov. 17-21, 2014, pp. 1-8.

LG Electronics, "Common control message transmission for MTC," R1-144895, 3GPP TSG RAN WG1 Meeting #79, San Francisco, USA, Nov. 17-21, 2014 (downloaded on Nov. 8, 2014), 6 pages.

ZTE, "Considerations on common control messages for MTC enhancement," R1-144820, 3GPP TSG RAN WG1 Meeting #79, San Francisco, US, Nov. 17-21, 2014 (downloaded on Nov. 8, 2014), 7 pages.

* cited by examiner

FIG. 8
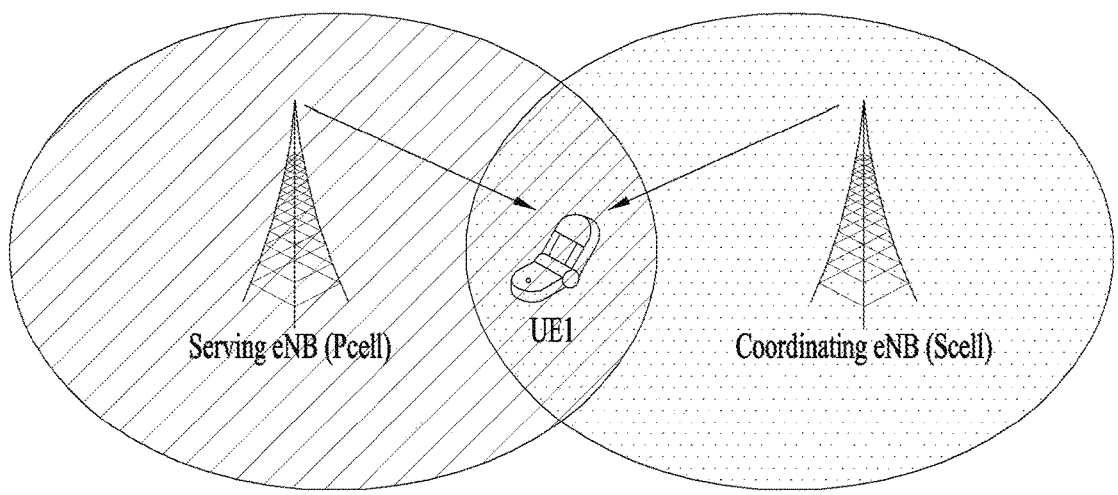
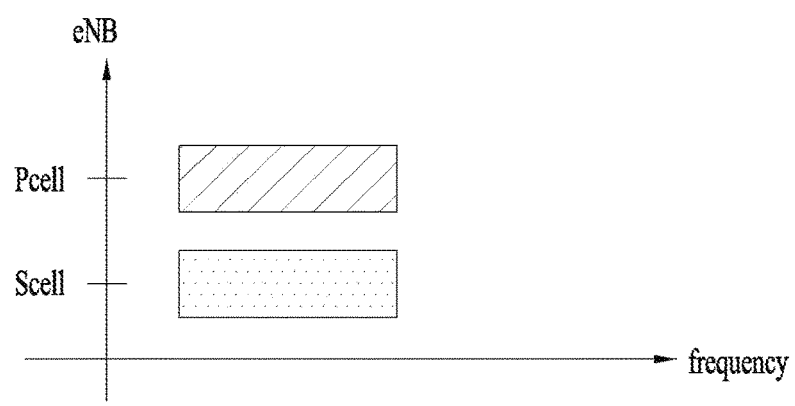

METHOD AND APPARATUS FOR TRANCEIVING COMMON CONTROL MESSAGE IN WIRELESS ACCESS SYSTEM SUPPORTING NARROW BAND INTERNET OF THINGS

CROSS REFERENCE TO RELATED APPLICATIONS

This application is the National Phase of PCT International Application No. PCT/KR2016/001028, filed on Jan. 29, 2016, which claims priority under 35 U.S.C. 119(e) to U.S. Provisional Application No. 62/109,615, filed on Jan. 30, 2015, all of which are hereby expressly incorporated by reference into the personal application.

TECHNICAL FIELD

The present disclosure relates to a wireless access system supporting Narrow Band Internet of Things (NB-IoT), and more particularly, to a method and apparatus for transmitting and receiving a common control message and/or data.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide a method for transmitting and receiving data and/or control information for a Narrow Band Internet of Things (NB-IoT) User Equipment (UE).

Another aspect of the present disclosure is to provide a method for repeatedly transmitting and receiving a common control message for an NB-IoT UE.

Another aspect of the present disclosure is to provide a method for allocating a bandwidth for transmitting control information and/data to an NB-IoT UE.

Another aspect of the present disclosure is to provide apparatuses supporting these methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatuses for transmitting and receiving a common control message and/or data in a wireless access system supporting Narrow Band Internet of Things (NB-IoT).

In an aspect of the present disclosure, a method for transmitting a common control message in a wireless access system supporting NB-IoT includes allocating a bandwidth for the NB-IoT, and transmitting a common control message in the allocated bandwidth. The bandwidth may be configured to be aligned with a boundary of a Physical Resource Block (PRB) used in a legacy system, and a PRB minimizing an offset between a center frequency of the bandwidth and a center frequency of the PRB may be allocated as the bandwidth for the NB-IoT, in consideration of a bandwidth of the legacy system.

In another aspect of the present disclosure, an apparatus for transmitting a common control message in a wireless access system supporting NB-IoT includes a transmitter, and a processor for supporting transmission of a common control message. The processor may be configured to allocate a bandwidth for the NB-IoT, and transmit the common control message in the allocated bandwidth by controlling the transmitter. The bandwidth may be configured to be aligned with a boundary of a PRB used in a legacy system, and a PRB minimizing an offset between a center frequency of the bandwidth and a center frequency of the PRB may be allocated as the bandwidth for the NB-IoT, in consideration of a bandwidth of the legacy system.

Virtual Resource Blocks (VRBs) mapped to the PRB allocated as the bandwidth for the NB-IoT may be used for the transmission of the common control message.

The bandwidth may be allocated, with a VRB affecting center 6 RBs of the legacy system avoided.

The common control message may be transmitted repeatedly a predetermined number of times.

It is preferred that the PRB allocated as the bandwidth for the NB-IoT is not used as a Distributed Virtual Resource Block (DVRB) in the legacy system.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

First, data and/or control information for a Narrow Band Internet of Things (NB-IoT) User Equipment (UE) may be transmitted and received efficiently.

Secondly, it may be configured that if an NB-IoT system operates in an in-band mode, the effect of the in-band-mode operation on a legacy system is minimized.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 8 is a conceptual view of a Coordinated Multi-Point (CoMP) system operating in a CA environment;

BEST MODE FOR CARRYING OUT THE INVENTION

Figure 1:
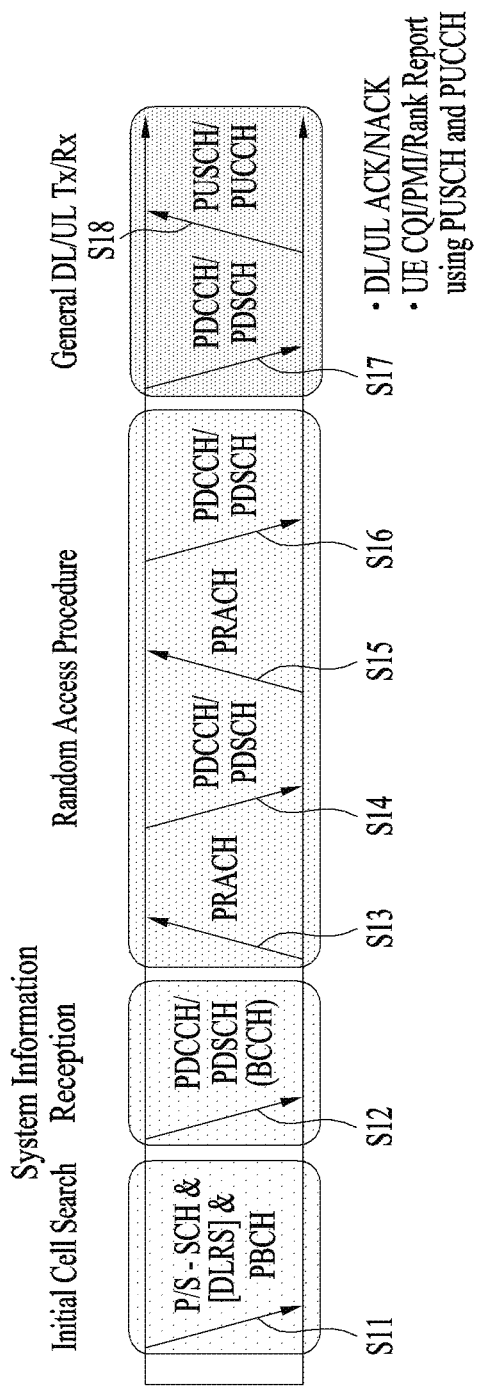
FIG. 1 is a view illustrating physical channels and a signal transmission method using the physical channels.

Embodiments of the present disclosure as described below in detail provide a method and apparatuses for using a heterogeneous network signal to measure the location of a User Equipment (UE).

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
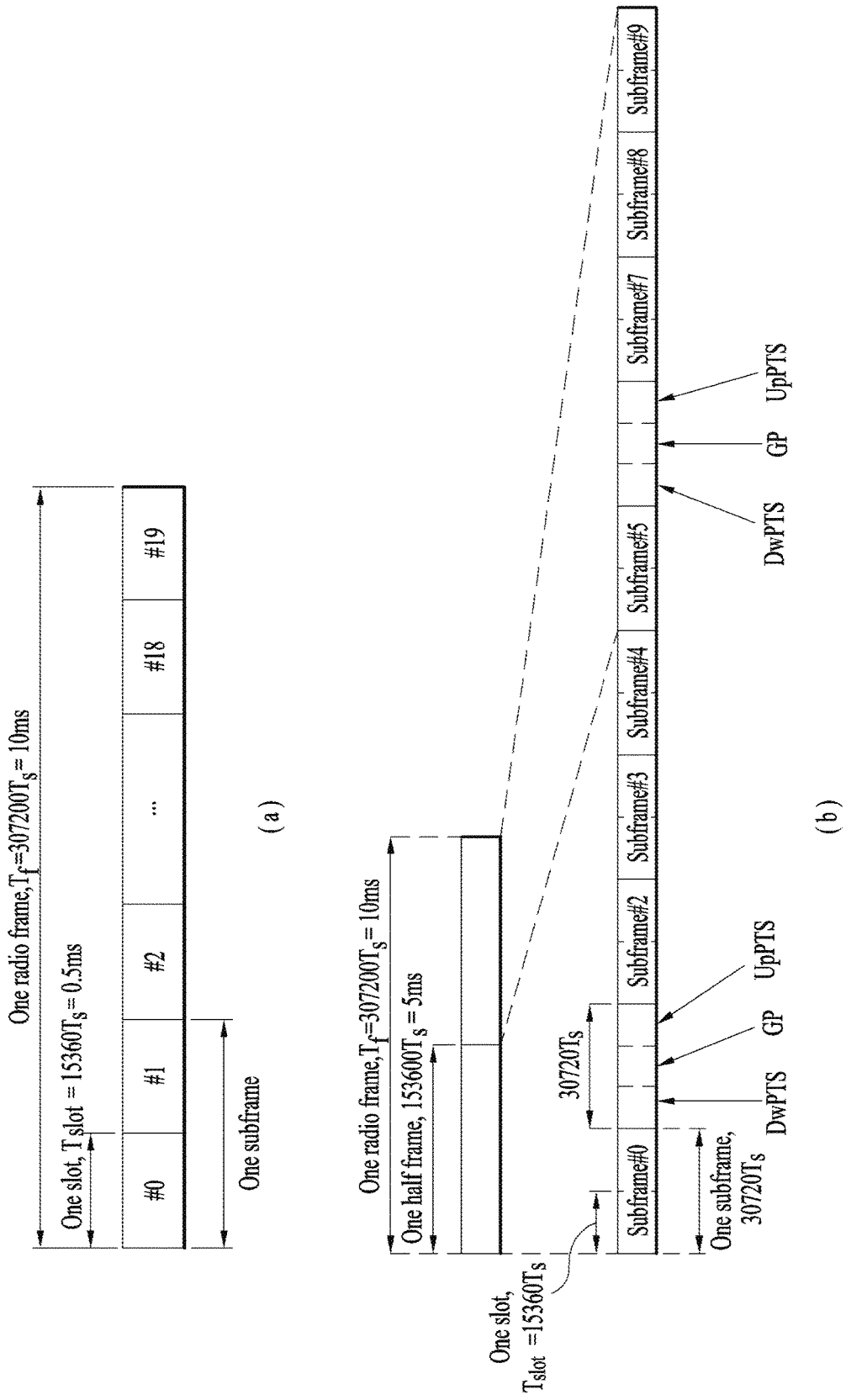
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
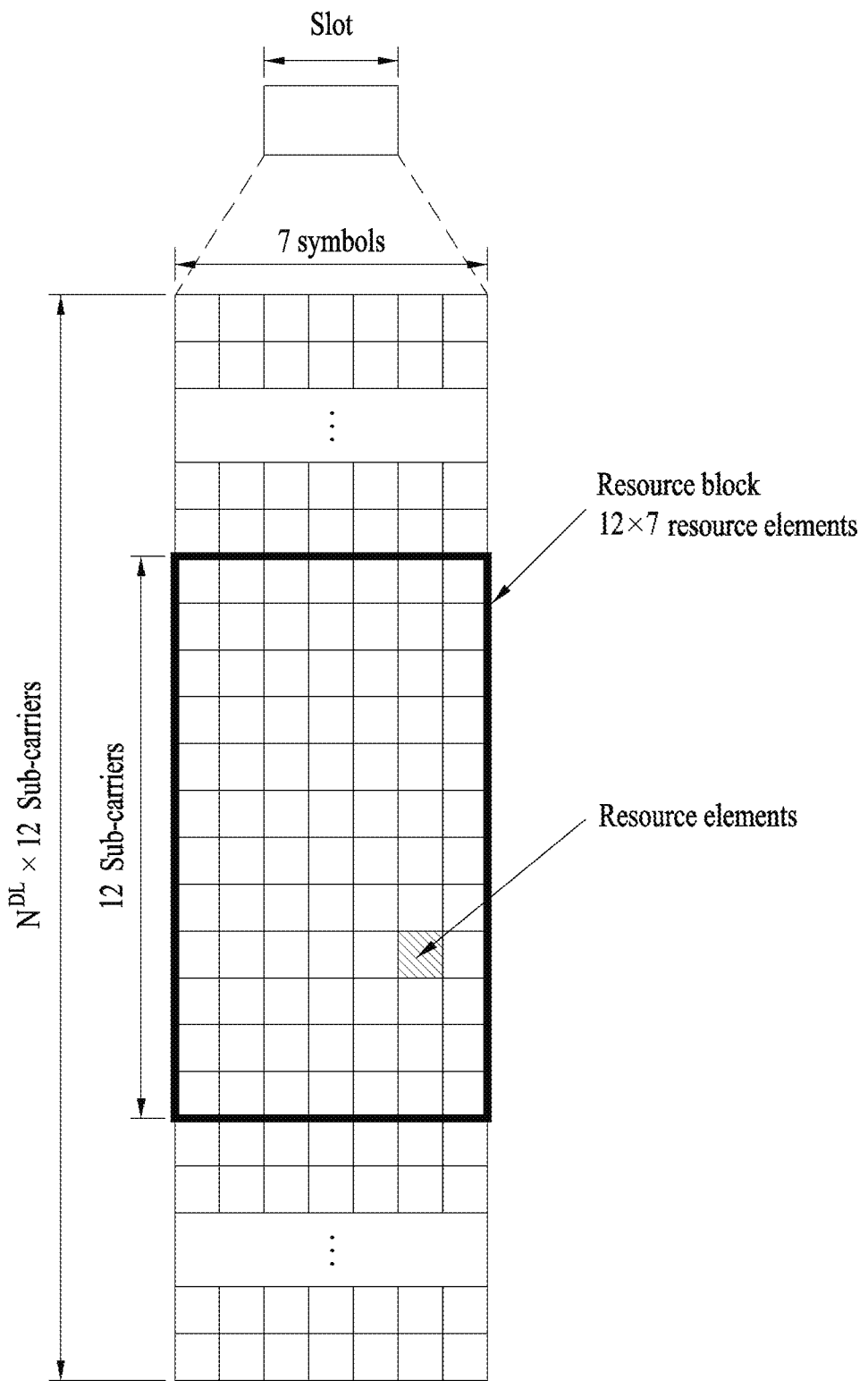
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
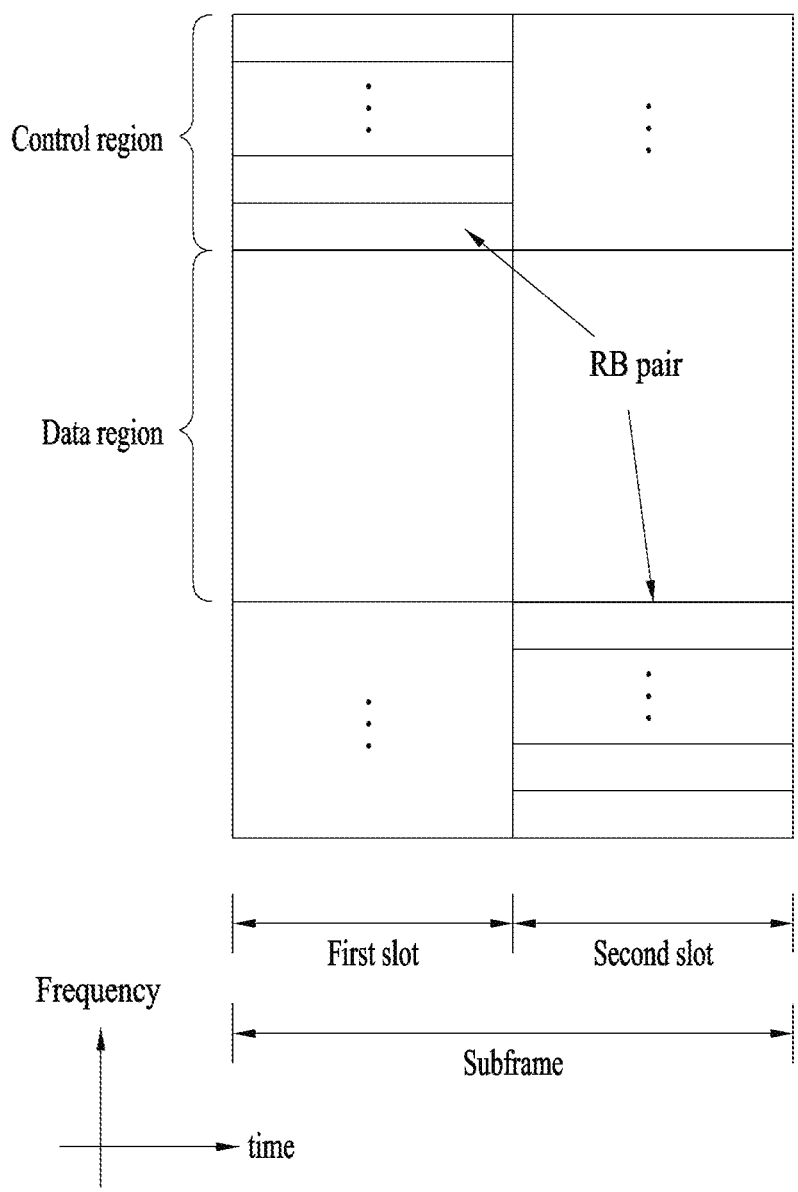
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
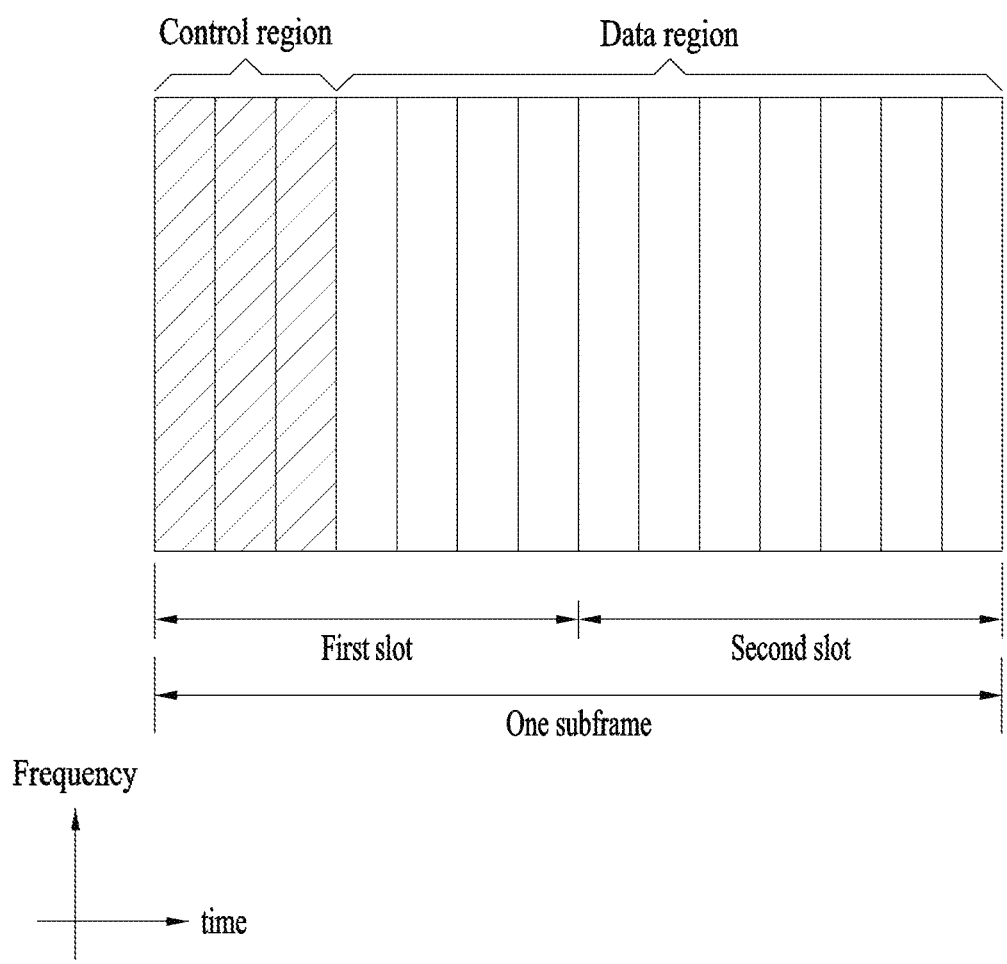
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control 1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop preceding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k + m) \bmod \lfloor N_{CCE,k}/L \rfloor\} + i \quad \text{[Equation 1]}$$

Herein, $M^{(L)}$ is the number of PDCCH candidates with CCE aggregation level L to be monitored in the SS, $m = 0, \ldots, M^{(L)} - 1$, i is the index of a CCE in each PDCCH candidate, and $i = 0, \ldots, L-1$. $k = \lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

TABLE 5-continued

| Type | Search space $S_k^{(L)}$ Aggregation level L | Size [in CCEs] | Number of PDCCH candidates $M^{(L)}$ |
|---|---|---|---|
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

Herein, $Y_{-1} = n_{RNTI} \neq 0$, $n_{RNTI}$ indicating an RNTI value. A=39827 and D=65537.

1.3 Carrier Aggregation (CA) Environment 1.3.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
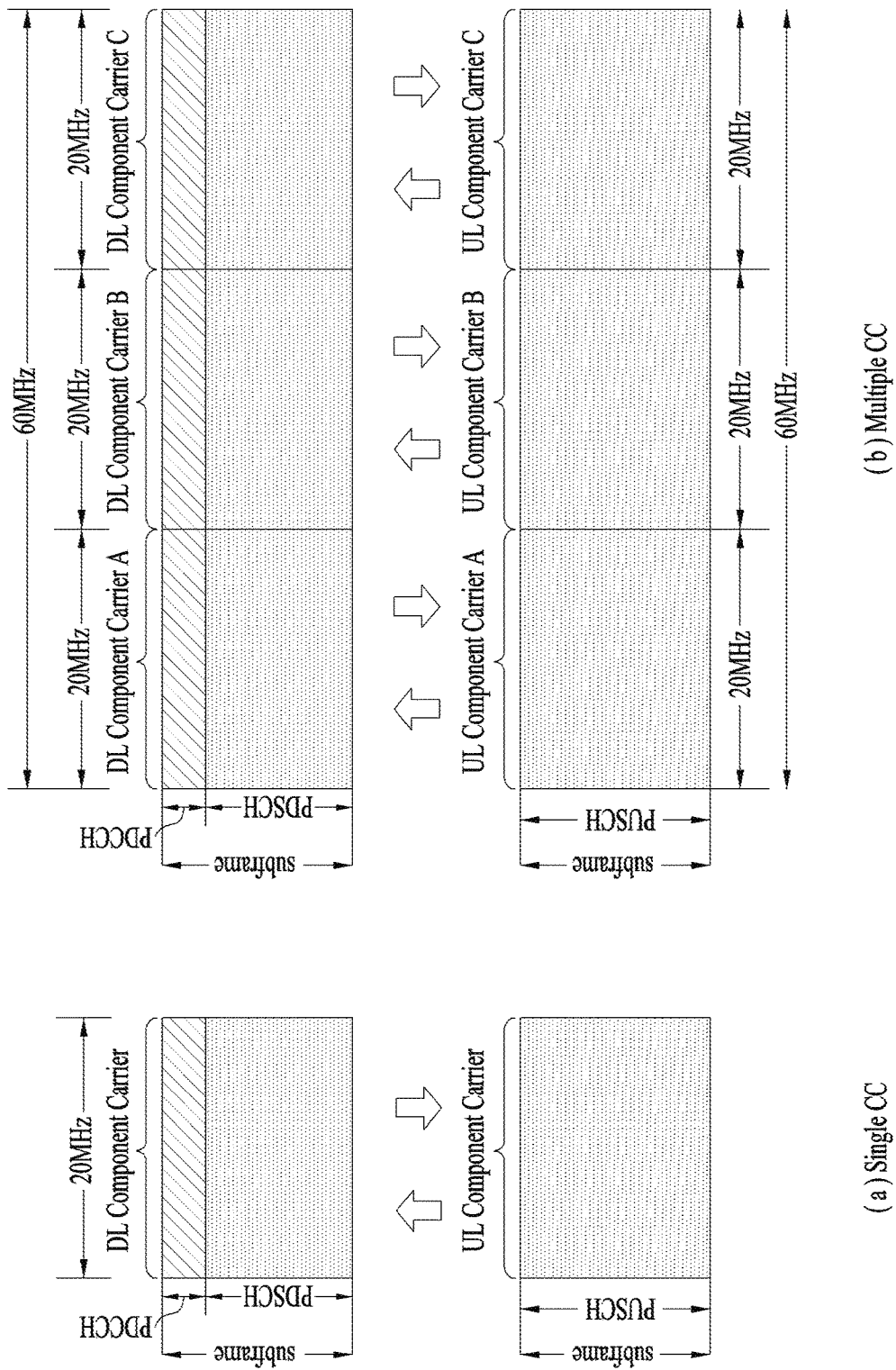
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

1.3.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
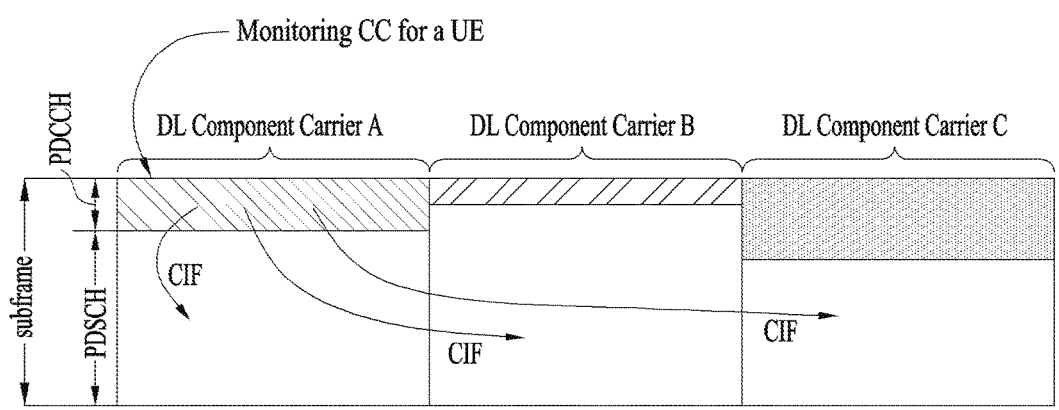
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 8 is a conceptual view illustrating a CoMP system operating based on a CA environment.

In FIG. 8, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 8 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

Herein, SIB1 includes cell access-related parameters and scheduling information about other SIBs. SIB1 is transmitted every 80 ms, and a UE should be able to receive SIB1 in idle mode/connected mode. SIB1 is transmitted every 80 ms, and a UE should be able to receive SIB1 in idle mode/connected mode. Transmission of SIB1 starts in subframe #5 of a radio frame satisfying SFN mod 8=0 and proceeds in subframe #5 of a radio frame satisfying SFN mod 2=0. SIB1 is transmitted, including the following information.

TABLE 6

```
SystemInformationBlockType1 :=            SEQUENCE {
    cellAccessRelatedInfo                 SEQUENCE {
        plmn-IdentityList                     PLMN-IdentityList,
        trackingAreaCode                      TrackingAreaCode,
        cellIdentity                          CellIdentity,
        cellBarred                            ENUMERATED {barred, notBarred},
        intraFreqReselection                  ENUMERATED {allowed, notAllowed}.
        csg-Indication                        BOOLEAN,
        csg-Identity                          CSG-Identity            OPTIONAL    -- Need OR
    },
    cellSelectionInfo                     SEQUENCE {
        q-RxLevMin                            Q-RxLevMin,
        q-RxLevMinOffset                          INTEGER (1..8)      OPTIONAL    -- Need OP
    }.
    p-Max                                 P-Max                       OPTIONAL,   -- Need OP
    freqBandIndicator                     FreqBandIndicator,
    schedulingInfoList                    SchedulingInfoList,
    tdd-Config                            TDD-Config                  OPTIONAL,   -- Cond TDD
    si-WindowLength                       ENUMERATED {
                                              ms1, ms2, ms5, ms10, ms15, ms20,
                                              ms40},
    systemInfoValueTag                    INTEGER (0..31),
    nonCriticalExtension                  SystemInformationBlockType1-v890-IEs    OPTIONAL
}
SchedulingInfoList ::= SEQUENCE (SIZE (1..maxSI-Message)) OF SchedulingInfo
SchedulingInfo ::= SEQUENCE {
    si-Periodicity                        ENUMERATED {
                                              rf8, rf16, rf32, rf64, rf128, rf256, rf512},
    sib-MappingInfo                       SIB-MappingInfo
}
SIB-MappingInfo ::= SEQUENCE (SIZE (0..maxSIB-1)) OF SIB-Type
SIB-Type ::=                              ENUMERATED {
                                              sibType3, sibType4, sibType5, sibType6,
                                              sibType7, sibType8, sibType9, sibType10,
                                              sibType11, sibType12-v920, sibType13-v920,
                                              sibType14-v1130, sibType15-v1130,
                                              sibType16-v1130, sibType17-v12xy, spare1, ...}
```

1.4 System Information Block (SIB)

SIBs are used for an eNB to transmit system information. That is, a UE may acquire system information by receiving different SIBs from the eNB. The SIBs are transmitted on a DL-SCH at the logical layer, and on a PDSCH at the physical layer. It is determined whether there is an SIB, by a PDCCH signal masked with a System Information Radio Network Temporary Identifier (SI-RNTI).

Among the SIBs, SIB type 1 (SIB1) includes parameters required to determine whether a corresponding cell is suitable for cell selection, and information about time-axis scheduling of other SIBs. SIB type 2 (SIB2) includes common channel information and shared channel information. SIB3 to SIB8 include cell reselection-related information, inter-frequency information, intra-frequency information, and so on. SIB9 is used to indicate the name of a Home eNode B (HeNB), and SIB10, SIB11, and SIB12 include an Earthquake and Tsunami Warning Service (ETWS) notification and a Commercial Mobile Alert System (CMAS) alert message. SIB13 includes Multimedia Broadcast Multicast Service (MBMS)-related control information.

For a description of the parameters included in SIB1, as listed in [Table 6], refer to sub-clauses 5.2.2.7 and 6.2.2 of 3GPP TS 36.331.

SI messages may be transmitted within a time area (i.e., an SI window) generated periodically by dynamic scheduling. Each SI message is related to a specific SI window, and the specific SI windows do not overlap with other SI messages. A common SI window length may be set for all SI messages.

Within an SI window, a corresponding SI message is transmitted a plurality of times in all subframes except for MBSFN subframes, and UL subframes and subframes #5 of radio frames satisfying SFN mod 2=0 in TDD. A UE may acquire specific time-domain scheduling information from SI messages.

RVs are determined for a PDSCH scheduled by a PDCCH masked with an SI-RNTI in DCI format 1C, according to the following [Equation 3].

$$RV_K = \text{ceiling}(3/2 * k) \text{ modulo } 4 \qquad \text{[Equation 3]}$$

In [Equation 3], k is determined according to the type of an SI message. For example, k=(SFN/2) modulo 4 for an SIB1 message. Here, SFN represents a system frame number. For each piece of system information, k=i modulo 4 and i=0, 1, . . . , $n_s^w$−1 where i represents the number of a subframe within an SI window $n_s^w$.

1.5 Method for Transmitting Paging Message

A paging message is used to deliver paging information, SI message update information, a Public Warning System (PWS) message, or the like. A default paging cycle may be set for each cell and a dedicated paging cycle may be set for each UE, for transmission of a paging message. If two or more paging cycles are set for a UE, a minimum paging cycle becomes the paging cycle of the UE.

Paging subframes available for transmission of a paging message may be calculated by [Equation 4].

SFN mod $T=(T/N)\times(UE\_ID \bmod N)$  [Equation 4]

In embodiments of the present disclosure, i_s represents an index indicating a predefined table that defines paging subframes, and i_s=floor(UE_ID/N) mod $N_S$. In [Equation 4], T is the UE Discontinuous Reception (DRX) cycle of the UE and may be given as T=min($T_c,T_{UE}$) where $T_c$ is a cell-specific default paging cycle which may be set to {32, 64, 128, 256} radio frames, and $T_{UE}$ is a UE-specific paging cycle which may be set to {32, 64, 128, 256} radio frames. N represents the number of paging frames within one paging cycle, and may be given as N=min(T, nB) where nB is the number of paging subframes per paging cycle {4T, 2T, T, T/2, T/4, T/8, T/16, T/32}. $N_S$ represents the number of paging subframes in a radio frame used for paging and it is configured that $N_s$=max(1, nB/T).

[Table 7] and [Table 8] below illustrate paging subframe patterns in FDD and TDD, respectively.

TABLE 7

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

TABLE 8

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

[Table 9] illustrates exemplary paging subframes determined according to [Equation 4] and paging-related parameters.

TABLE 9

| Case | UE_ID | $T_c$ | $T_{UE}$ | T | nB | N | $N_s$ | PF | i_s | PO |
|---|---|---|---|---|---|---|---|---|---|---|
| A | 147 | 256 | 256 | 256 | 64 | 64 | 1 | 76 | 0 | 9 |
| B | 147 | 256 | 128 | 128 | 32 | 32 | 1 | 76 | 0 | 9 |
| C | 147 | 256 | 128 | 128 | 256 | 128 | 2 | 19 | 1 | 4 |

1.6 Reference Signal (RS)

Now, a description will be given of RSs that may be used in embodiments of the present disclosure.

Figure 9:
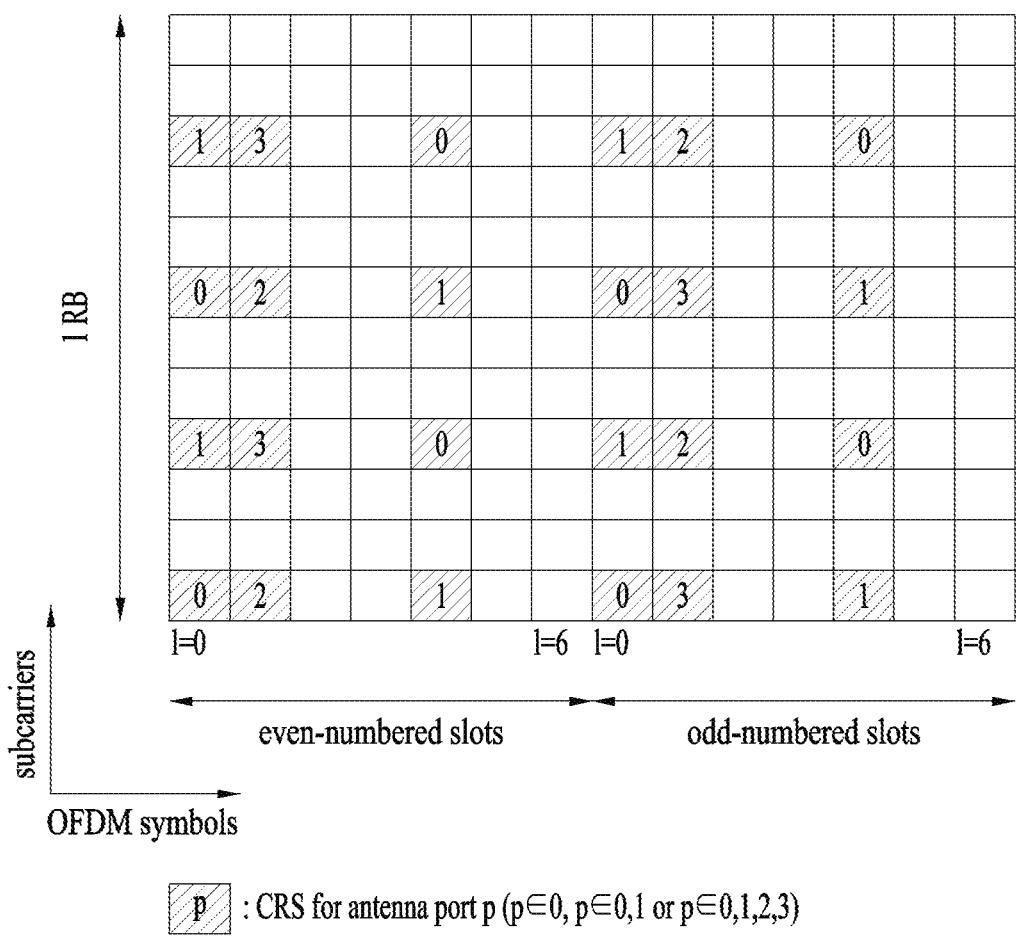
FIG. 9 is a view illustrating an exemplary subframe to which Cell-specific Reference Signals (CRSs) are allocated, which may be used in embodiments of the present disclosure.

FIG. 9 is a view illustrating an exemplary subframe in which Cell-specific Reference Signals (CRSs) are allocated, which may be used in embodiments of the present disclosure.

FIG. 9 illustrates a CRS allocation structure, when a system supports four antennas. CRS is used for the purpose of decoding and channel state measurement in the 3GPP LTE/LTE-A system. Therefore, CRSs are transmitted across a total DL bandwidth in every DL subframe in a cell supporting PDSCH transmission, and through all antenna ports configured for an eNB.

Specifically, a CRS sequence is mapped to complex-valued modulation symbols used as reference symbols for antenna port p in slot $n_s$.

A UE may measure CSI using CRSs and decode a DL data signal received on a PDSCH in a subframe including CRSs, using the CRSs. That is, the eNB transmits CRSs at predetermined positions in every RB, and the UE performs channel estimation based on the CRSs and then detects the PDSCH. For example, the UE measures signals received in CRS REs. The UE may detect a PDSCH signal in REs to which the PDSCH is mapped, based on the ratio between per-CRS RE reception energy and per-PDSCH RE reception energy.

If a PDSCH signal is transmitted based on CRSs in this manner, the eNB should transmit CRSs in all RBs, resulting in unnecessary RS overhead. To solve the problem, the 3GPP LTE-A system additionally defines UE-specific RS (hereinafter, referred to as UE-RS) and Channel State Information Reference Signal (CSI-RS) as well as CRS. UE-RS is used for demodulation, and CSI-RS is used for deriving CSI.

Since UE-RS and CRS are used for demodulation, they may be referred to as demodulation RS in terms of their usage. That is, UE-RS may be regarded as a kind of Demodulation Reference Signal (DM-RS). Further, since CSI-RS and CRS are used for channel measurement or channel estimation, they may be regarded as channel state measurement RS in terms of their usage.

Figure 10:
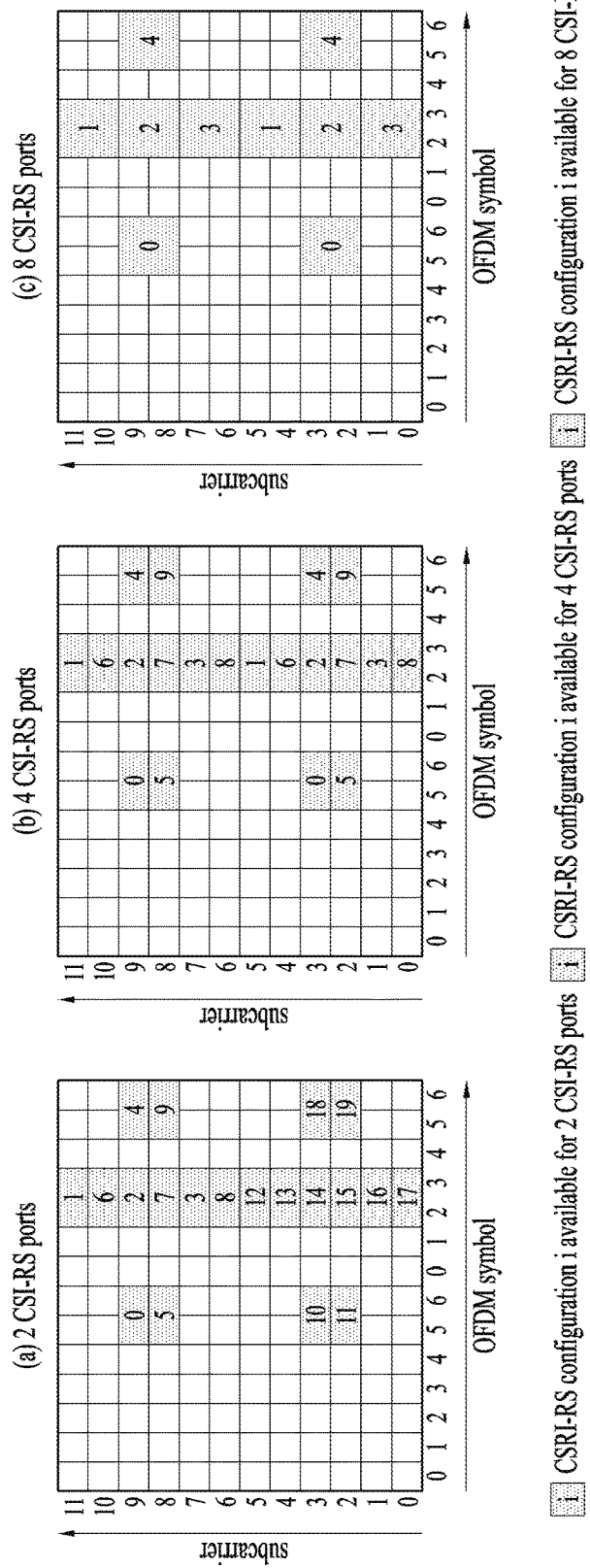
FIG. 10 is a view illustrating exemplary subframes to which Channel State Information Reference Signals (CSI-RSs) are allocated according to numbers of antenna ports, which may be used in embodiments of the present disclosure.

FIG. 10 is a view illustrating exemplary subframes in which CSI-RSs are allocated according to numbers of antenna ports, which may be used in embodiments of the present disclosure.

CSI-RS is a DL RS which has been introduced to the 3GPP LTE-A system, for the purpose of radio channel state measurement, not demodulation. The 3GPP LTE-A system defines a plurality of CSI-RS configurations for CSI-RS transmission. A CSI-RS sequence is mapped to complex-valued modulation symbols used as reference symbols for antenna port p in subframes for which CSI-RS transmission is configured.

FIG. 10(a) illustrates 20 CSI-RS configurations, CSI-RS configuration 0 to CSI-RS configuration 19 available for CSI-RS transmission through 2 CSI ports, among CSI-RS configuration, FIG. 10(b) illustrates 10 CSI-RS configurations, CSI-RS configuration 0 to CSI-RS configuration 9 available for CSI-RS transmission through 4 CSI ports, among the CSI-RS configurations, and FIG. 10(c) illustrates 5 CSI-RS configurations, CSI-RS configuration 0 to CSI-RS configuration 4 available for CSI-RS transmission through 8 CSI ports, among the CSI-RS configurations.

Herein, a CSI-RS port refers to an antenna port configured for CSI-RS transmission. A different CSI-RS configuration is used according to the number of CSI-RS ports. Therefore, in spite of the same CSI-RS configuration number, the CSI-RS configuration is different for a different number of antenna ports configured for CSI-RS transmission.

Compared to CRSs configured to be transmitted in every subframe, CSI-RSs are configured to be transmitted in every predetermined transmission period corresponding to a plurality of subframes. Accordingly, the CSI-RS configuration differs according to a subframe for which CSI-RSs are configured as well as the positions of REs occupied by CSI-RSs in an RB pair.

Despite the same CSI-RS configuration number, the CSI-RS configuration may be considered to be different in a different subframe for CSI-RS transmission. For example, if ae CSI-RS transmission period $T_{CSI-RS}$ is different or a starting subframe $\Delta_{CSI-RS}$ in which CSI-RS transmission is configured in a radio frame is different, the CSI-RS configuration may be considered to be different.

In order to distinguish (1) a CSI-RS configuration to which a CSI-RS configuration number is assigned from (2) a CSI-RS configuration which varies according to a CSI-RS configuration number, the number of CSI-RS ports, and/or a subframe for which CSI-RSs are configured, the latter CSI-RS configuration (2) will be referred to as a CSI-RS resource configuration, and the former CSI-RS configuration (1) will be referred to as a CSI-RS configuration or a CSI-RS pattern.

When the eNB indicates a CSI-RS resource configuration to a UE, the eNB may transmit to the UE information about the number of antenna ports used for transmission of CSI-RSs, a CSI-RS pattern, a CSI-RS subframe configuration $I_{CSI-RS}$, a UE assumption on reference PDSCH transmission power for CSI feedback, $P_c$, a Zero Power (ZP) CSI-RS configuration list, a ZP CSI-RS subframe configuration, and so on.

The index of a CSI-RS subframe configuration, $I_{CSI-RS}$ is information that specifies a subframe configuration periodicity $T_{CSI-RS}$ for occurrence of CSI-RSs, and a subframe offset $\Delta_{CSI-RS}$. [Table 10] below lists exemplary CSI-RS subframe configuration indexes, $I_{CSI-RS}$ according to $T_{CSI-RS}$ and $\Delta_{CSI-RS}$.

TABLE 10

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying [Equation 5] are CSI-RS subframes.

$$(10n_f+\lfloor n_s/2 \rfloor - \Delta_{CSI-RS}) \mod T_{CSI-RS} = 0 \qquad \text{[Equation 5]}$$

A UE for which a Transmission Mode (TM) defined beyond 3GPP LTE-A (e.g., TM9 or a newly defined TM) has been configured may perform channel measurement using CSI-RSs, and decode a PDSCH using UE-RSs.

A UE for which a Transmission Mode (TM) defined beyond 3GPP LTE-A (e.g., TM9 or a newly defined TM) has been configured may perform channel measurement using CSI-RSs, and decode a PDSCH using UE-RSs.

1.7 Enhanced PDCCH (EPDCCH)

In Cross-Carrier Scheduling (CCS) under a situation in which a plurality of Components Carriers (CCs=(serving) cells) are aggregated in the 3GPP LTE/LTE-A system, one scheduled CC may be pre-configured to be DL/UL-scheduled only by one other scheduling CC (i.e., so that a DL/UL grant PDCCH for the scheduled CC may be received). Basically, the scheduling CC may perform DL/UL scheduling for itself. In other words, a Search Space (SS) for a PDCCH that schedules a scheduling/scheduled CC in the CCS relationship may exist in the control channel region of every scheduling CC.

Meanwhile, the LTE system allocates the first n (n<=4) OFDM symbols of each subframe to transmission of physical channels, PDCCH, PHICH, and PCFICH carrying control information and allocates the other OFDM symbols of the subframe to PDSCH transmission in an FDD DL carrier or TDD DL subframes. The number of OFDM symbols used for transmission of control channels in each subframe may be indicated to UEs, dynamically on a physical channel such as the PCFICH or semi-statically by RRC signaling.

Figure 11:
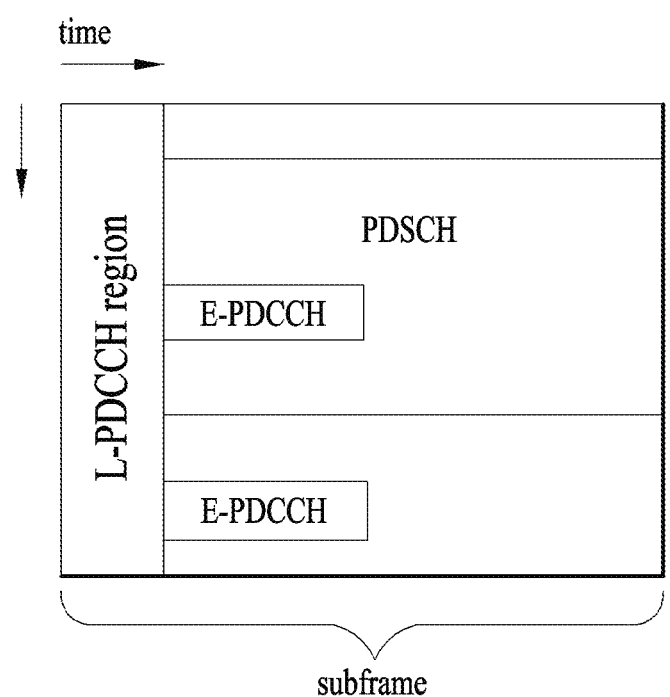
FIG. 11 is a view illustrating exemplary multiplexing of a legacy Physical Downlink Control Channel (PDCCH), a Physical Downlink Shared Channel (PDSCH), and an Enhanced PDCCH (EPDCCH) in an LTE/LTE-A system.

A physical channel used for DL/UL scheduling and transmission of various types of control information, PDCCH has limitations such as transmission in limited OFDM symbols in the LTE/LTE-A system. Therefore, an extended PDCCH (i.e., EPDCCH) multiplexed more freely with a PDSCH in Frequency Division Multiplexing (FDM)/Time Division Multiplexing (TDM) may be introduced, instead of a control channel such as the PDCCH transmitted in OFDM symbols separate from PDSCH symbols. FIG. 11 is a view illustrating exemplary multiplexing of the legacy PDCCH, the PDSCH, and the EPDCCH in the LTE/LTE-A system.

2. Improved MTC Coverage 2.1 MTC UE

For an LTE-A system (beyond Rel-12) as a future-generation wireless communication system, it is under consideration to configure low-price/low-specification UEs that conduct mainly data communication such as metering, water level measurement, use of a surveillance camera, and stock reporting of a vendor machine. In embodiments of the present disclosure, such UEs will be referred to as MTC UEs.

MTC is a scheme of conducting communication between devices without human intervention. Smart metering may be considered to be a major application of MTC. Smart metering is an application technology of attaching a communication module to a metering device for measurement of electricity, gas, water, and so on, and transmitting measurement information periodically to a central control center or a data collection center.

Further, since MTC UEs are supposed to be produced and distributed at low prices, the MTC UEs may be designed to support only a very narrow band (e.g., equal to or less than 1RB, 2RBs, 3RBs, 4RBs, 5RBs, or 6RBs), compared to a general cellular system. In this case, an MTC UE is not capable of decoding a DL control channel region transmitted across a total system band as is done in the general cellular system, and control information for the MTC UE may not be transmitted in the DL control channel region. That is why the amount of control information for an MTC UE is decreased and the amount of resources for data transmission to the MTC UE is also decreased.

An MTC UE used for smart metering may have difficulty in communicating with an eNB because the MTC UE is highly likely to be installed in a shadowing area such as a basement. Accordingly, data needs to be transmitted repeatedly on a DL channel and/or a UL channel to overcome the difficulty. For example, the PDCCH/EPDCCH, PDSCH, PUSCH, and PUCCH may all be transmitted repeatedly.

To realize low-price MTC UEs, the bandwidth of the MTC UEs may be limited. That is, although a system bandwidth is 10 MHz, an MTC UE may transmit and receive signals only in 1.4 MHz. The present disclosure proposes a method for transmitting and receiving a Positioning Reference Signal (PRS) in a PRS subframe, a method for transmitting and receiving a PDSCH, and an operation of an MTC UE. Unless otherwise specified, the following embodiments of the present disclosure may be implemented based on the description of clause 1.

2.2 Method for Improving MTC Coverage

Now, a description will be given of methods for improving coverage for MTC UEs.

2.2.1 TTI Bundling/HARQ Retransmission/Repeated Transmission/Code Spreading/RLC Segmentation/Low Rate Coding/Low Modulation Order/New Decoding Techniques For MTC UEs, more energy may be accumulated to improve coverage by prolonging a transmission time. For example, the existing TTI bundling and HARQ retransmission in a data channel may be effective to MTC UEs. Since the current maximum number of UL HARQ retransmissions is 28 and TTI bundling is up to 4 consecutive subframes, TTI bundling with a larger TTI bundle size may be considered and the maximum number of HARQ retransmissions may be increased, to achieve better performance. Aside from TTI bundling and HARQ retransmission, the same or different RVs may be applied to repeated transmissions of data. In addition, code spreading in the time domain may also be considered to improve coverage.

MTC traffic packets may be RLC-segmented into smaller packets, and very low rate coding, a lower modulation order (e.g., BPSK), and a shorter-length CRC may also be used.

New decoding techniques (e.g. correlation or reduced SS decoding) may be used to improve coverage by taking into account the characteristics of particular channels (e.g., a channel periodicity, a parameter change rate, a channel structure, limited content, etc.).

2.2.2 Power Boosting/Power Density Spectrum (PDS) Boosting

The eNB may transmit, to an MTC UE, DL data with more power (i.e., power boosting), or at a given power level in a reduced bandwidth (i.e., PSD boosting). The application of power boosting or PSD boosting depends on the channel or signal under consideration.

2.2.5 Small Cell for Coverage Improvement

Coverage enhancements using link improvements are preferably provided for scenarios in which no small cells have been deployed by an operator. That is, an operator may deploy traditional coverage improvement solutions using small cells (including Pico, Femto, Remote Radio Heads (RRHs), relays, repeaters, etc.) to provide coverage enhancements to MTC UEs and non-MTC UEs alike. In deployments of small cells, a path loss from a UE to the closest cell is reduced. As a result, for MTC UEs, a required link budget may be reduced for all channels. Depending on the small cell location/density, the coverage enhancement may still be required.

For eNB deployments that already contain small cells, there may be a benefit to further allow decoupled UL and DL for delay-tolerant MTC UEs. For UL, the best serving cell is chosen based on a least coupling loss. For DL, due to large transmission power imbalance (including antenna gains) between a macro cell and a Low Power Node (LPN), the best serving cell is one with a maximum received signal power. This UL/DL decoupled association is feasible for MTC traffic especially for services without tight delay requirements.

To enable a UL/DL decoupled operation either in a UE-transparent or non-transparent manner, a macro serving cell and potential LPNs may need to exchange information for channel (e.g. RACH, PUSCH, and SRS) configurations and to identify a suitable LPN. A different RACH configuration from that of non-decoupled UL/DL may be needed for decoupled UL/DL.

Possible link-level solutions for coverage enhancement of various physical channels and signals are summarized in [Table 11].

TABLE 11

| Signals Solutions | Channels | | | | | |
|---|---|---|---|---|---|---|
| | PSS/SSS | PBCH | PRACH | (E)PDCCH | PDSCH/PUSCH | PUCCH |
| PSD boosting | x | x | x | x | x | |
| Relaxed requirement | x | | x | | | |
| Design new channels/signals | x | x | x | x | x | |
| Repetition | | x | x | x | x | x |
| Low rate coding | | x | | x | x | x |
| TTI bundling/Retransmission | | | | | x | |
| Spreading | | x | | | x | |
| RS power boosting/increased RS density | | x | | x | x | |
| New decoding techniques | x | | | | | |

2.2.3 Relaxed Requirement

The performance requirements for some channels may be relaxed considering the characteristics (e.g., greater delay tolerance) of MTC UEs in extreme scenarios. For the Synchronization Signal (SS), MTC UEs may accumulate energy by combining Primary SS (PSS) or Secondary SS (SSS) a plurality of times, but this will prolong an acquisition time. For a PRACH, a loosened PRACH detection threshold rate and a higher false alarm rate at the eNB may be considered.

2.2.4 Design of New Channel or Signal

New design of channels or signals for better coverage is possible if implementation-based schemes cannot meet coverage improvement requirements. These channels and signals, together with other possible link-level solutions for coverage enhancement will be described below.

3. Method for Transmitting Common Control Message for MTC UEs

When a UE initially accesses a specific serving cell, the UE receives, from an eNodeB managing and controlling the serving cell, a Master Information Block (MIB) for the serving cell on a PBCH, and an SIB message and RRC parameters on a PDSCH. Further, the UE may receive a paging message to receive changed system information or paging information.

Since an MTC UE may be installed in an area (e.g., a basement) under a poor transmission environment, compared to a legacy UE, if the eNodeB transmits an SIB message to the MTC UE and the legacy UE in the same manner, the MTC UE may have difficulty in receiving the SIB message. To solve the problem, in the case where the eNodeB transmits an SIB or paging message on a PDSCH to an MTC UE facing such a coverage issue, the eNodeB may transmit the SIB or paging message by applying a coverage enhancement technique such as subframe repetition or subframe bundling.

Various methods for transmitting a common control message such as an SIB message and a paging message to MTC UEs will be described below in detail.

3.1 Subframes for Repetition

Common control messages (e.g., SIB1 message) for MTC UEs may be designed newly, including all or part of information transmitted in legacy common control messages. For the convenience of description, one of the common control messages, SIB1 will be taken, and the same description is applicable to other common control messages.

A SIB1 transmitted to general UEs is referred to as a legacy SIB1, and a SIB1 for MTC UEs is referred to as a MTC SIB1.

Transmission of legacy SIB1 starts in subframe (SF) #5 of a radio frame satisfying the relationship that SFN mod 8=0, and is repeated in SF #5 satisfying SFN mod 2=0. Accordingly, legacy SIB1 is transmitted four times during a time period of 80 ms.

For coverage improvement, common control messages may also be repeatedly transmitted to MTC UEs. Repeated transmissions to an MTC UE means that with 4 repeated transmissions of legacy SIB1 during a time period of 80 ms used as one set, this set is transmitted repeatedly a plurality of times.

Thus, if the legacy SIB1 transmission method for legacy UEs is still used for MTC UEs, a latency will be increased in repeated transmissions. For example, if MTC SIB1 is transmitted repeatedly 100 times, 25 80-ms period transmissions are required. That is, the time required for repeated transmissions of MTC SIB1 is 2000 ms (=25*80 ms).

In this context, embodiments of the present disclosure propose novel methods for transmitting MTC SIB1 to reduce a latency.

First of all, the eNB may also consider transmission of MTC SIB1 in an SF other than SF #5. Since it is preferable that reception of MTC SIB1 at an MTC UE is not affected by PMCH transmission, the eNB transmits MTC SIB1 preferably in non-MBSFN SFs (e.g., SF #0, SF #4, and SF #9).

It is also preferable not to transmit unicast data for the MTC UE in an SF carrying MTC SIB1. Thus, as MTC SIB1 is transmitted in an entire maximum bandwidth (e.g., 6 PRBs) supported for the MTC UE, the required number of repeated transmissions of MTC SIB1 may be reduced.

That is, if an SF carrying MTC SIB1 is included in a time period during which a PDSCH carrying MTC unicast data is repeatedly transmitted, the eNB does not transmit the PDSCH carrying the MTC unicast data. The MTC UE may also decode the SF, assuming that the repeated PDSCHs are not transmitted in the SF carrying MTC SIB1.

3.2 Method for Transmitting PDCCH to Schedule Common Control Message

The eNB may transmit an MTC SIB1 message on a PDSCH in radio resources (i.e., 6 RBs) corresponding to a maximum bandwidth allowed for an MTC UE. If the eNB schedules the PDSCH delivering the MTC SIB1 message by a PDCCH/EPDCCH, control information of the PDCCH/EPDCCH does not need to include resource allocation information. This is because the MTC SIB1 message is transmitted in the maximum bandwidth. Accordingly, the PDCCH/EPDCCH may include information about a Transport Block Size (TBS) and information about a repeated transmission number, instead of resource allocation information.

The PDCCH/EPDCCH that schedules MTC SIB1 also needs to be repeatedly transmitted because it is also transmitted to the MTC UE. However, if the last SF of the repeated transmissions is not SF #5 of a radio frame satisfying SFN mod 2=0, it is preferable to transmit the PDCCH/EPDCCH in SF #5 of the next earliest radio frame satisfying this relationship. Similarly, since MTC SIB1 starts to be transmitted in SF #5 of a radio frame satisfying SFN mod 8=0, if the last SF of the PDCCH/EPDCCH repeated transmissions does not satisfy this relation equation, it is preferable to transmit the PDCCH/EPDCCH in SF #5 of the next earliest radio frame satisfying this relation equation.

Since a processing time is required for decoding the repeatedly transmitted PDCCH/EPDCCH, the PDSCH repeated transmissions may start in a $k^{th}$ (k>1) SF after the last SF of the PDCCH/EPDCCH repeated transmissions, not in the last SF of the PDCCH/EPDCCH repeated transmissions. In this case, if the PDCCH/EPDCCH repeated transmissions are not completed in SF #(5-k) of an RF satisfying SFN mod 8=0 or SFN mod 2=0, the eNB may start to transmit or repeatedly transmit the PDSCH for transmission of MTC SIB1 in SF #5 of the next earliest radio frame satisfying the relation equation.

That is, although a PDCCH/EPDCCH including scheduling information for legacy SIB transmission is transmitted in the same SF carrying an SIB message in the legacy system, the PDCCH/EPDCCH including scheduling information for MTC SIB1 transmission may be configured to be transmitted in a different SF from the SF carrying MTC SIB1.

If the repeated transmissions of MTC SIB1 take place in SFs other than SF #5 of a radio frame satisfying SFN mod 2=0, the above method may be applied in the same manner.

In another method, the starting time of the PDCCH/EPDCCH repeated transmissions may be fixed or indicated by a PBCH so that the PDSCH transmission may occur in a corresponding radio frame to which the last SF of the repeated transmissions of the PDCCH/EPDCCH scheduling the PDSCH for transmission of MTC SIB1 belongs.

If the system does not support the PDCCH/EPDCCH due to no need for scheduling the PDSCH for transmission of MTC SIB1, the number of PDSCH repeated transmissions may be fixed or indicated by the PBCH. Or the number of PDSCH repeated transmissions may be determined based on another parameter.

3.3 Method for Setting RVs

If an MTC SIB1 message is transmitted in SFs other than SF #5 due to its repeated transmissions, RVs may be set for a PDSCH carrying MTC SIB1 in the SFs other than SF #5 in the following methods.

(1) Method 1

The RV of an SF in which MTC SIB1 starts to be transmitted may be set to RV0, and the RVs of subsequent SFs in which MTC SIB1 is repeatedly transmitted may be set in the order of RV1, RV2, RV3, RV0, RV1 . . . or RV2, RV3, RV1, RV0, RV2 . . . . This method may bring the effect of reducing repeated transmissions of an MTC SIB message by maximizing a coding gain.

(2) Method 2

The same RV may be set for a radio frame carrying MTC SIB1.

For example, if MTC SIB1 is transmitted in two SFs of a radio frame carrying MTC SIB1, the wireless access system may set an RV for SF #5 in the same manner as for legacy SIB1, and the RVs of MTC SIB1 transmitted in the other SFs to the RV in SF #5.

That is, as an RV is changed on a frame-by-frame basis, the same RV may be used for MTC SIBs repeatedly transmitted in the same radio frame. Due to reuse of the legacy method, this method simplifies implementation of the reception functionality of an MTC UE, for MTC SIB1.

Figure 12:
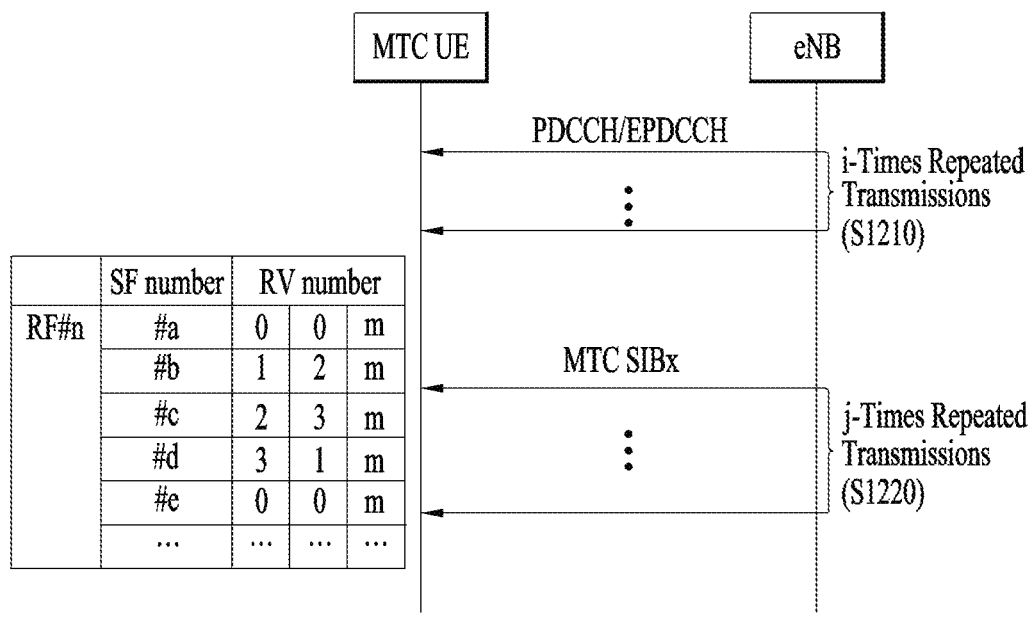
FIG. 12 is a view illustrating a method for repeatedly transmitting a PDCCH, and a method for setting Redundancy Versions (RVs)

FIG. 12 is a view illustrating methods for repeatedly transmitting a PDCCH and setting RVs.

FIG. 12 illustrates the PDCCH repeated transmission and RV setting methods described in sub-clauses 3.2 and 3.3 from the viewpoint of signaling. Referring to FIG. 12, the eNB may transmit a PDCCH/EPDCCH carrying control information for MTC SIB transmission, repeatedly i times. For a description of the PDCCH/EPDCCH, refer to sub-clauses 1.2 and 1.7 (S1210).

The i-times repeated transmissions of the PDCCH/EPDCCH in step S1210 may be performed according to the description of sub-clause 3.2. For example, while a PDCCH/EPDCCH for an MTC UE may be transmitted repeatedly i times, if an MTC SIB is transmitted in a maximum system bandwidth allowed for the MTC UE, the PDCCH/EPDCCH may include information about a TBS and/or the repetition number of the MTC SIB, instead of radio resource scheduling information. Further, SFs carrying the PDCCH/EPDCCH may be configured to be different from SFs carrying the repeated MTC SIB.

The eNB may transmit an MTC SIBx message repeatedly j times based on the control information transmitted on the PDCCH/EPDCCH (S1220).

When MTC SIBx is repeatedly transmitted j times in operation S1220, RVs may be set for MTC SIBx according to the description of sub-clause 3.3. For example, if the repeated transmissions of the MTC SIBx message start in SF #a of radio frame #n, the RVs may be set in the order of {0, 1, 2, 3, 0, . . . } or {0, 2, 3, 1, 0, . . . }, or the same RV (e.g., m) may be set across radio frame #n.

3.4 CSI-RS Transmission Method

CSI-RSs are not transmitted in an SF carrying legacy SIB1 in order to avoid the performance degradation of legacy SIB1 caused by CSI-RS transmission in the LTE/LTE-A system.

In the case of MTC in coverage enhancement mode, an MTC SIB1 message may be transmitted in an SF other than an SF carrying legacy SIB1. Herein, MTC SIB1 and CSI-RS transmissions may take place in an SF that does not carry legacy SIB1. The eNB may transmit CSI-RSs in the following methods.

(1) Method 1

An MTC UE may assume that CSI-RSs are transmitted in none of SFs carrying MTC SIB1 like SFs carrying legacy SIB1. According to this method, although CSI feedback performance may be degraded due to discontinuation of CSI-RS transmissions in proportion to repeated transmissions of MTC SIB1, the performance degradation of MTC SIB1 may be avoided.

(2) Method 2

CSI-RSs may be transmitted as configured in SFs carrying MTC SIB1 except for SFs carrying legacy SIB1. Although this method may avoid the performance degradation of CSI feedback using CSI-RSs, it may degrade the performance of MTC SIB1. The performance degradation of MTC SIB1 may be prevented by Method 2-1 or Method 2-2 as described below.

(3) Method 2-1

Regarding Method 2, the MTC UE may decode an MTC SIB1 message, assuming that all REs available for CSI-RS transmission have been rate-matched.

(4) Method 2-2

Regarding Method 2, the MTC UE may decode a repeatedly transmitted MTC SIB1 message, assuming that CSI-RSs are not transmitted. In this case, the eNB may puncture REs for transmission of the MTC SIB message in a corresponding SF according to a CSI-RS configuration, map CSI-RSs to the REs, and transmit the CSI-RSs.

(5) Method 3

The eNB may transmit legacy CSI-RSs as configured, in SFs carrying repeated MTC SIB1 other than SFs carrying legacy SIB1, except for a band (e.g., center 6 RBs) carrying MTC SIB1. Although this method brings about the performance degradation of CSI feedback for a band in which CSI-RSs are not transmitted, it may not degrade the performance of MTC SIB1.

(6) Method 4

The eNB may be configured to transmit a specific CSI-RS configuration in SFs carrying MTC SIB1 except for SFs carrying legacy SIB1. In this case, the MTC UE may perform decoding, assuming that MTC SIB1 is rate-matched in specific CSI-RS REs and transmitted in the remaining CSI-RS REs.

Figure 13:
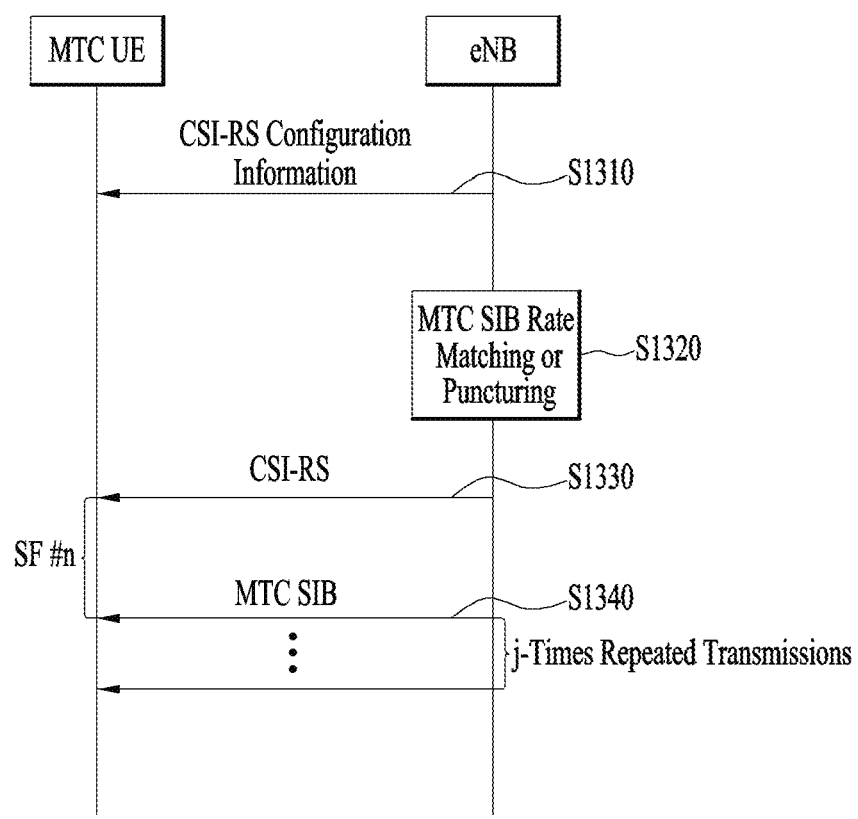
FIG. 13 is a view illustrating a method for transmitting CSI-RSs in the case of repeated transmissions of a Machine Type Communication (MTC) System Information Block (SIB)

FIG. 13 is a view illustrating a CSI-RS transmission method, in the case of repeated transmissions of an MTC SIB.

FIG. 13 is intended to describe a method for transmitting CSI-RSs as described in sub-clause 3.4. Referring to FIG. 13, an eNB may transmit CSI-RS configuration information to a UE by a higher-layer signal. For CSI-RSs and CSI-RS configuration information, sub-clause 1.6 may be referred to (S1310).

If the eNB needs to transmit CSI-RSs according to the CSI-RS configuration information and transmit an MTC SIB to the MTC UE, the eNB may transmit the MTC SIB and the CSI-RSs based on the description of sub-clause 3.4.

For example, if the eNB should transmit the CSI-RSs and the MTC SIB in the same SF (e.g., SF #n), the eNB may rate-match the CSI-RSs and the MTC SIB, or puncture the MTC SIB and map the CSI-RSs to corresponding REs, and transmit the CSI-RSs and the MTC SIB to the UE (S1320, S1330, and S1340).

If the MTC SIB is repeatedly transmitted j times in a plurality of SFs, the MTC SIB may be transmitted as it is in SFs not overlapped with the CSI-RSs.

3.5 Method for Configuring and Transmitting New SIB

In embodiments of the present disclosure, aside from MTC SIB1, system information for MTC UEs may be newly defined. For the convenience of description, the new system information will be referred to as MTC SIBx. MTC SIBx may define a time period (e.g., SI window) during which MTC SIBx may be transmitted, like a legacy SIB.

Preferably, MTC SIBx is transmitted in an SF that does not carry the PBCH and MTC SIB1, and preferably in non-MBSFN SFs (e.g., SF #0, SF #4, SF #5, and SF #9) to avoid collision with the PMCH. If repeated transmissions of MTC SIBx are not completed within the SI window, they may continue in the next SI window.

A coverage enhancement-mode MTC UE may assume that a PDCCH/EPDCCH that schedules a PDSCH carrying one MTC SIBx at maximum is repeatedly transmitted within the SI window, in consideration of implementation complexity. It is preferred to complete repeated transmissions of the PDCCH/EPDCCH scheduling MTC SIBx within one SI window. Otherwise, it is assumed that MTC SIBx is not transmitted.

If MTC SIBx is transmitted, it is not preferable to transmit MTC SIBx and MTC unicast data at the same time. Therefore, like MTC SIB1, MTC SIBx may be transmitted in the maximum bandwidth (e.g., 6 PRBs) of an MTC UE, thereby reducing the number of repeated transmissions. RVs may be set for MTC SIBx according to the foregoing RV setting method for MTC SIB1 as described in sub-clause 3.3.

3.6 Method for Transmitting Paging Message

A paging message is transmitted in an SF configured as a paging SF for a corresponding UE by a UE_ID and a related parameter configuration. When the eNB configures paging messages, it is not preferred to transmit paging messages for a legacy UE and an MTC UE on the same PDSCH. Therefore, a paging group is formed with MTC UEs.

A paging message may be transmitted in SFs (e.g., SF #4 and SF #9) that do not carry the PBCH or MTC SIB1/MTC SIBx.

In another method, if the sum of TBs for a paging message and MTC SIB1/MTC SIBx is equal to or less than a predetermined value, they may be transmitted in the same SF.

To repeatedly transmit a paging message, one paging message may include a paging message for one MTC UE. Herein, the paging message may be repeatedly transmitted in paging SFs for the corresponding MTC UE. In the case where the repeated transmission period of the paging message overlaps with the transmission period of MTC SIB1/MTC SIBx, if the sum of TBs for the paging message and MTC SIB1/MTC SIBx is equal to or less than a predetermined value, they may be transmitted in an overlapped repeated transmission period.

In another method, paging messages or the MTC SIB/MTC SIBx is prioritized, and only a paging message having a higher priority level may be transmitted. Resources used for an initially transmitted paging message may be used for repeated transmissions of the paging message.

To reduce the number of repeated transmissions, the paging message may be transmitted in a maximum bandwidth (e.g., 6 PRBs) supported by an MTC UE. RVs may also be set for the paging message in the same method as used for MTC SIB1 or MTC SIBx. If an SF carrying a paging message overlaps with an SF carrying CSI-RSs, the same method as used for transmissions of MTC SIB1 and CSI-RSs may be applied to transmissions of an MTC paging message and CSI-RSs.

3.7 Bandwidth Allocation Method

A legacy SIB, a paging message, and so on are scheduled by a PDCCH masked with an SI-RNTI/P-RNTI in DCI format 1C. If transmission of scheduling information in DCI format 1C is failed, the scheduling information may be transmitted in DCI format 1A by fallback. In this case, since DCI format 1A is larger in size than DCI format 1C, the coding rate and the required SINR are increased. The resulting decrease in the number of PDCCH candidates may make it impossible for a UE at a cell edge to receive a control signal. In this case, a PDSCH carrying a legacy SIB or a paging message may be transmitted in resources allocated by a Distributed Virtual Resource Block (DVRB) resource allocation scheme.

MTC SIBs may be transmitted in up to center 6 RBs in a system bandwidth. With reference made to 3GPP TS 36.211/36.212/36.213, Virtual Resource Block (VRB) indexes affecting the center 6 RBs by DVRB allocation are listed in [Table 12] to [Table 16].

TABLE 12

| PRB index | 9 | 10 | 11 | 12 | 13 | 14 | 15 |
|---|---|---|---|---|---|---|---|
| VRB index in slot 0 | 13 | 17 | 21 | 2 | 6 | 10 | 14 |
| VRB index in slot 1 | 15 | 19 | 23 | 0 | 4 | 8 | 12 |

TABLE 13

| PRB index | 22 | 23 | 24 | 25 | 26 | 27 |
|---|---|---|---|---|---|---|
| VRB index in slot 0 | 41 | | | | | 2 |
| VRB index in slot 1 | 43 | | | | | 0 |

TABLE 14

| PRB index | 22 | 23 | 24 | 25 | 26 | 27 |
|---|---|---|---|---|---|---|
| VRB index in slot 0 | 32 | 34 | 19 | 23 | 27 | 20 |
| VRB index in slot 1 | 33 | 35 | 21 | 25 | 29 | 18 |

TABLE 15

| PRB index | 47 | 48 | 49 | 50 | 51 | 52 |
|---|---|---|---|---|---|---|
| VRB index in slot 0 | 93 | 2 | 6 | 10 | 14 | 18 |
| VRB index in slot 1 | 95 | 0 | 4 | 8 | 12 | 16 |

TABLE 16

| PRB index | 47 | 48 | 49 | 50 | 51 | 52 |
|---|---|---|---|---|---|---|
| VRB index in slot 0 | 61 | 34 | 38 | 42 | 46 | 50 |
| VRB index in slot 1 | 63 | 32 | 36 | 40 | 44 | 48 |

[Table 12] to [Table 16] list exemplary VRB indexes mapped to center 7 RBs (if the bandwidth includes an odd number of RBs) or center 6 RBs (if the bandwidth includes an even number of RBs) according to DVRB allocation scheduled by DCI format 1C. [Table 12] to [Table 16] list VRB indexes for a 25-RB system bandwidth (about 5 MHz), VRB indexes for a first group of values for a 50-RB system bandwidth (about 10 MHz), VRB indexes for a second group of values for the 50-RB system bandwidth, VRB indexes for a first group of values for a 100-RB system bandwidth (about 20 MHz), and VRB indexes for a second group of values for the 100-RB system bandwidth, respectively.

As noted from [Table 12] to [Table 16], if the system bandwidth is less than 25 RBs, most of PRBs are mapped to center 6 RBs. For reference, in the case of DVRB allocation scheduled by DCI format 1C, if the system bandwidth is less than 50 RBs, DVRBs are allocated in units of 2 RBs, and if the system bandwidth is equal to or greater than 50 RBs, DVRBs are allocated in units of 4 RBs. Accordingly, if an eNB and/or an MTC UE repeatedly transmits MTC data in subframes carrying a legacy SIB or a paging message, interference caused by the repeated transmissions may degrade the performance of detecting the legacy SIB and/or the paging message in legacy UEs.

Referring to [Table 12] to [Table 16], it is noted that the freedom with which the eNB performs scheduling, avoiding the center 6 RBs increases relatively in the 50-RB/100-RB system. Preferably, MTC user data/control data is not scheduled in an SF carrying a legacy SIB or a paging message.

Or depending on a system bandwidth, MTC user data/control data may be configured to be transmitted in an SF carrying a legacy SIB or a paging message. For example, if the system bandwidth is less than x RBs, an MTC UE may perform decoding, assuming that MTC user data/control data is not transmitted in an SF carrying a legacy SIB or a paging message. On the other hand, if the system bandwidth is equal to or greater than x RBs, the MTC UE may perform decoding, assuming that a legacy SIB or a paging message is transmitted in an SF carrying MTC user data/control data.

Particularly, a legacy SIB1 message and an MTC SIB1 message may be configured to be transmitted in different SFs.

Or it may be configured that a legacy SIB1 message and an MTC SIB1 message are transmitted in the same or different SFs depending on whether the system bandwidth is less than y RBs, as described above (refer to clause 3.3).

3.8 MTC PDSCH Transmission Method

Aside from center 6 RBs of a system bandwidth, an MTC PDSCH may be transmitted repeatedly in other 6 RBs configured by the network. That is, 6 RBs at maximum may be configured as a system bandwidth for MTC UEs. For the convenience of description, the 6 RBs are referred to as an MTC subband.

The position of the MTC subband may be changed over time. The position of the MTC subband may be changed in the frequency domain over time, for example, MTC subband x occupies PRB #0 to PRB #5 at time n (or in subframe #n), and PRB #6 to PRB #11 at time n+k (k>0).

Or a higher layer may configure a plurality of MTC subbands, and the eNB may be configured to transmit the MTC PDSCH in a different MTC subband with passage of time.

Meanwhile, compared to a legacy PBCH which is transmitted in SF #0 every 40 ms, MTC PBCH repeated transmissions may be configured to take place during a specific time period. Herein, an MTC subband carrying the MTC PDSCH and a band in which the MTC PBCH is repeatedly transmitted may overlap with a part or all of the center 6 RBs. In this case, considering that the repeated transmissions of the MTC PBCH consume much time and frequency resources, resources may be used efficiently by allowing the higher layer to enable or disable the repeated transmissions of the MTC PBCH in a specific time period.

Due to no knowledge of on/off of the MTC PBCH repeated transmissions, the MTC UE preferably performs decoding, assuming that the MTC PDSCH is not transmitted in a PRB of the MTC subband, overlapped with the center 6 RBs. That is, the MTC UE assumes that the MTC PDSCH is not transmitted at all in an MTC PBCH repeated transmission period in which the MTC PBCH is likely to be transmitted, irrespective of on/off of the MTC PBCH repeated transmissions.

For example, if the MTC PBCH is transmitted in SF #0 and/or SF #5, the MTC UE may perform decoding, assuming that the MTC PDSCH is not transmitted in a part or all of RBs overlapped with the center 6 RBs in SF #0 and/or SF #5.

3.9 Method for Transmitting Control Signal in NB-IoT System

UE cost may further be reduced by supporting a bandwidth of only 1 PRB fewer than 6 PRBs for a system supporting MTC. This system may be defined as an NB-IoT system. Further, a UE supporting operations of the NB-IoT system may be referred to as an NB-IoT UE. The following three operation modes are defined for the NB-IoT system.

(1) In-band operation mode: In the in-band operation mode, a specific PRB of the legacy LTE/LTE-A system is allocated to NB-IoT. Advantageously, the already deployed LTE/LTE-A system may be utilized.

(2) Guard band operation mode: In the guard band operation mode, an NB-IoT band is allocated in a guard band configured to prevent interference between adjacent bands in the LTE/LTE-A system.

(3) Stand-alone operation mode: In the stand-alone operation mode, a frequency band corresponding to 1 PRB is allocated only for NB-IoT, irrespective of an LTE/LTE-A system band. For example, a frequency band used for legacy GSM (e.g., one channel is 200 KHz) may be allocated for the NB-IoT system. This operation mode is advantageous in that there are none of limitations on resource utilization, caused by transmission of a common control channel or signal from the legacy LTE/LTE-A system.

In the in-band operation mode, a specific PRB used in the legacy LTE/LTE-A system is allocated for the NB-IoT system. Therefore, it is preferred to allocate the PRB for supporting NB-IoT in alignment with the boundary of a PRB used in the LTE/LTE-A system. Otherwise, even though one PRB is allocated as an NB-IoT band, resources across two PRBs defined in the LTE/LTE-A system should be used, thereby decreasing the resource use efficiency of the LTE/LTE-A system.

The center frequency of the LTE/LTE-A system is set to a multiple of 100 KHz. As a consequence, a UE may perform cell search, while shifting the center frequency in units of 100 KHz, which reduces the implementation complexity of the UE. Accordingly, it is also preferred to set the center frequency to a multiple of 100 KHz for an NB-IoT UE.

In the in-band operation mode, therefore, it may be configured that the center frequency of the NB-IoT system is set to a multiple of 100 KHz and a PRB aligned with the boundary of a PRB used in the legacy LTE/LTE-A system is used in the NB-IoT system. In this case, the NB-IoT center frequency may not be the center frequency of the corresponding PRB, but may be at a frequency position with a misalignment of at least 2.5 KHz or 7.5 KHz depending on the LTE/LTE-A system bandwidth. Thus, the same effect as causing an additional frequency offset of 2.5 KHz or 7.5 KHz may occur to the NB-IoT UE.

Figure 14:
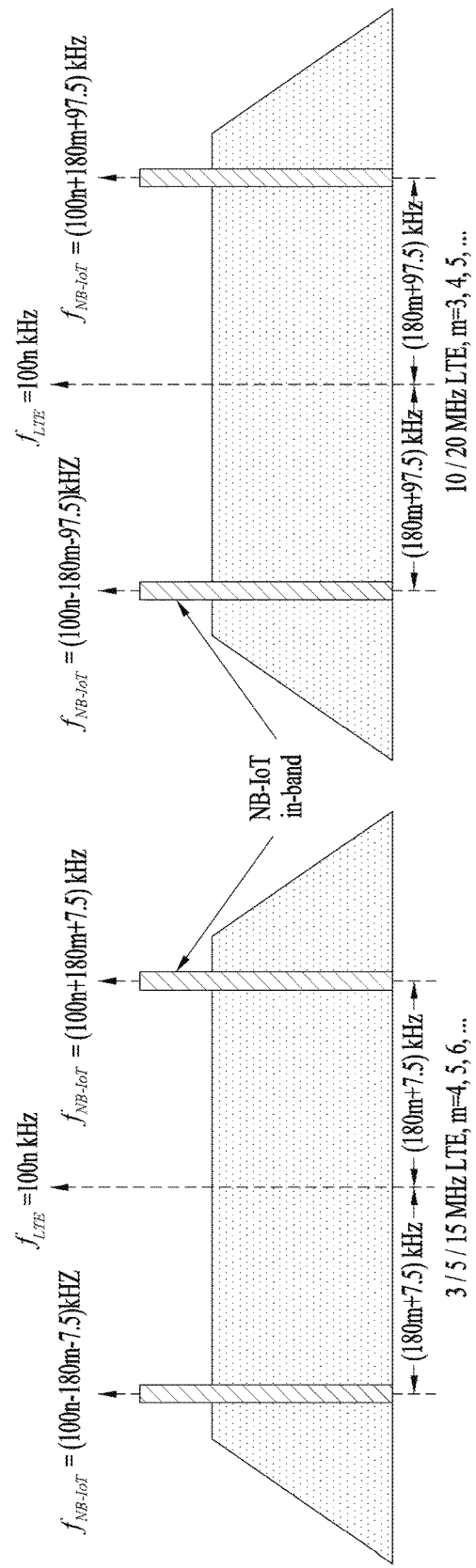
FIG. 14 is a view illustrating a relationship between the center frequency of an NB-IoT in an in-band mode and the center frequency of an LTE/LTE-A system.

FIG. 14 is a view illustrating a relationship between the center frequency of NB-IoT and the center frequency of an LTE/LTE-A system in the in-band operation mode.

Referring to FIG. 14, when the center frequency is set to a multiple of 100 KHz in the NB-IoT system, a generated center frequency of the NB-IoT system may be checked. In FIGS. 14(a) and 14(b), let each bandwidth be defined as a raster. Then, the center frequency of a raster in the LTE/LTE-A system and the center frequency of an NB-IoT PRB are placed in the relationship illustrated in FIG. 14. In FIG. 14, $f_{LTE}$ represents the center frequency of the LTE/LTE-A system, and $f_{NB-IoT}$ represents the center frequency of the NB-IoT system.

FIG. 14(a) illustrates a case in which a system bandwidth is configured to include an odd number of PRBs (e.g., 3

MHz, 5 MHz, 15 MHz, or the like), and FIG. 14(*b*) illustrates a case in which a system bandwidth is configured to include an even number of PRBs (e.g., 10 MHz, 20 MHz, or the like).

The center frequency of an NB-IoT band on the right side of each of FIGS. 14(*a*) and 14(*b*) will be taken as an example, for description. If the system bandwidth of the LTE/LTE-A system has an odd number of PRBs, the center frequency exists in the middle of a PRB. Therefore, the center frequency is set to 100 n+180 m+7.5 KHz (m=4, 5, 6, . . . ). If the system bandwidth of the LTE/LTE-A system has an even number of PRBs, the center frequency may be represented as 100 n+180 m+97.5 KHz (m=3, 4, 5, . . . ). In this manner, the center frequency of an NB-IoT band on the left side of each of FIGS. 14(*a*) and 14(*b*) may be configured.

Herein, because the center 6 RBs are used to transmit a control signal for legacy UEs and may be allocated for MTC UEs, the center 6 RBs may not be allocated to an NB-IoT UE. Therefore, it may be configured that m=4, 5, . . . in a system bandwidth having an odd number of PRBs, and m=3, 4, 5, . . . in a system bandwidth having an even number of PRBs.

If values of m are substituted in the center frequency of a bandwidth including an odd number of PRBs, $f_{NB-IoT}$ is set to 187.5, 367.5, 547.5, 727 . . . 5, 907.5 KHz. Thus, the difference between 907.5 KHz and a multiple of 100 KHz, 900 KHz is 7.5 KHz. In addition, if values of m are substituted in the center frequency of a bandwidth including an even number of PRBs, PRB indexes having a frequency difference of 2.5 KHz may be obtained.

Center frequency offsets which may be generated according to LTE/LTE-A system bandwidths in the case of alignment with a PRB boundary of the LTE/LTE-A system in the in-band operation mode will be described below.

(A) If the system bandwidth is 10 or 20 MHz: the offset between the center frequency and the PRB center frequency may be 2.5 KHz, 17.5 KHz, 22.5 KHz, 37.5 KHz, or 42.5 KHz.

(B) If the system bandwidth is 3.5 or 15 MHz: the offset between the center frequency and the PRB center frequency may be 7.5 KHz, 12.5 KHz, 27.5 KHz, 32.5 KHz, or 47.5 KHz.

In the cases of (A) and (B), therefore, a PRB of the LTE/LTE-A system corresponding to a minimum offset between the center frequencies, which is 2.5 or 7.5 KHz is preferably allocated as a PRB for the NB-IoT system. [Table 17] below lists PRB indexes and VRB indexes with an offset of 2.5 or 7.5 KHz according to LTE/LTE-A system bandwidths.

TABLE 17

|  | LTE/LTE-A system bandwidth | | | | |
| --- | --- | --- | --- | --- | --- |
|  | 3 MHz | 5 MHz | 10 MHz | 15 MHz | 20 MHz |
| PRB index with offset of 2.5 KHz | — | — | 4, 9, 14, 19, 30, 35, 40, 45 | — | 4, 9, 14, 19, 24, 29, 34, 39, 44, 55, 60, 65, 70, 75, 80, 85, 90, 95 |
| VRB index with offset of 2.5 KHz | — | — | Gap1: (16, 18), (36, 38), (9, 11), (29, 31), (14, 12), (34, 32), (5, 7), (25, 27), Gap2: (14, 15), (0, 2) (17, 16), (22, 24), (31, 30), (29, 27) |  | Gap1: (16, 18), (36, 38), (9, 11), (29, 31), (1, 3), (21, 23), (41, 43), (61, 63), (81, 83), (6, 4), (30, 28), (50, 48), (70, 68), (90, 88), (15, 13), (35, 33), (55, 53), (75, 73), (95, 93) Gap2: (14, 15), (0, 2) (17, 16), (22, 24), (3, 1), (21, 23), (40, 42), (60, 62), (49, 51), (38, 36), (62, 60), (51, 49), (68, 70), (88, 90), (77, 79), (66, 64), (86, 84), (95, 93), (75, 73) |
| PRB index with offset of 7.5 KHz | 2, 12 | 2, 7, 17, 22 | — | 2, 7, 12, 17, 22, 27, 32, 42, 47, 52, 57, 62, 67, 72 | — |
| VRB index with offset of 7.5 KHz | (8, 10), (3, 1) | (8, 10), (5, 7), (20, 22), (19, 17) | — | Gap1: (8, 10), (28, 30), (48, 50), (5, 7), (25, 27), (45, 47), (0, 2), (42, 40), (62, 61), (19, 17), (59, 57) Gap2: (8, 10), (28, 30), (17, 19), (6, 4), (26, 24), (13, 15), (32, 34), (41, 43), (60, 63), (50, 48), (59, 57) | — |

[Table 17] lists VRB indexes mapped to PRB indexes that may be borrowed from the LTE/LTE-A system, as a system bandwidth supporting the NB-IoT system in the in-band operation mode. Herein, numbers in a bracket represent two VRB indexes mapped to one PRB index. In addition, VRB indexes are listed in the order of PRB indexes in [Table 17].

For example, PRB indexes having an offset of 7.5 KHz among the PRB indexes of an LTE-A system having a 3-MHz band may be 2 and 12. Herein, VRB indexes mapped to PRB indexes 2 and 12 are respectively (8, 10) and (3, 1). In this manner, the position of a bandwidth to be allocated to an NB-IoT UE may be determined based on the mapping relationship between PRB indexes and VRB indexes, illustrated in [Table 17].

In this case, if a common control message of the legacy LTE/LTE-A system is transmitted in a DVRB, the eNB preferably selects a PRB unused for DVRB transmission among the PRB indexes of [Table 17], referring to [Table 12] to [Table 16] and allocates the selected PRB as an NB-IoT band. For example, in an LTE/LTE-A system having a bandwidth of 15 MHz, PRB indexes 64 to 74 are not used for DVRB transmission, and thus a system entity such as an eNB preferably allocates PRB index 72 of the LTE/LTE-A system as a system band for NB-IoT.

In another method, if the NB-IoT operates in the in-band operation mode, an NB-IoT UE performs decoding, assuming that DVRB transmission does not take place in the PRBs listed in [Table 17]. That is, when the PRB indexes listed in [Table 17] are allocated to NB-IoT, the eNB may perform resource allocation such that the PRBs may not be scheduled for DVRBs.

If DVRB transmission takes place in a PRB, the eNB may drop the DVRB transmission in the PRB to be transmitted to an NB-IoT UE and schedule DVRB transmission in the remaining PRBs.

Or if DVRB transmission takes place in the PRB, the eNB may minimize the effect of the DVRB transmission on the legacy system by puncturing data to be transmitted to the NB-IoT UE.

Figure 15:
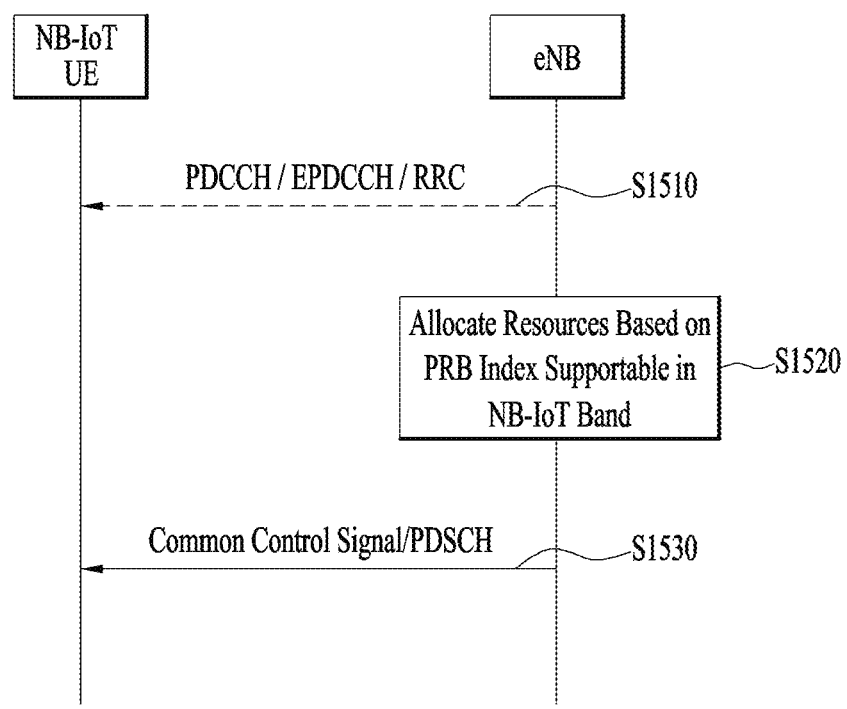
FIG. 15 is a view illustrating a method for allocating a bandwidth for transmitting a common control signal or data to an NB-IoT User Equipment (UE)

FIG. 15 is a view illustrating a method for allocating a bandwidth for transmitting a common control signal or data to an NB-IoT UE.

Referring to FIG. 15, the eNB may transmit, to an NB-IoT UE and/or a legacy UE, control information including resource allocation information (e.g., a PRB index and/or a VRB index) indicating resources available as a bandwidth for the NB-IoT system by a PDCCH, EPDCCH, MAC signal, or RRC signal (S1510).

However, step S1510 may be configured to be optional according to system requirements.

The eNB may allocate resources in which a common control signal or data will be transmitted, based on a PRB index supportable as an NB-IoT band. Herein, the eNB may allocate a VRB mapped to the PRB index as described with reference to [Table 17], for the NB-IoT band, avoiding VRBs corresponding to DVRBs as described before with reference to [Table 12] to [Table 16] (S1520).

That is, the eNB preferably avoids VRBs that may affect the center 6 RBs of the bandwidth in step S1520. In addition, in the case of alignment with a PRB boundary of a legacy system (e.g., the LTE/LTE-A system), a VRB mapped to a PRB that minimizes the offset between the center frequency of the NB-IoT system and the PRB center frequency of the legacy system may be allocated as the NB-IoT band.

The eNB may transmit a PDSCH carrying the common control signal and/or the data in the allocated NB-IoT band (S1530).

In step S1530, the common control signal and/or the data may be transmitted repeatedly. Since NB-IoT may be regarded as a kind of MTC, a common control signal and/or data for an NB-IoT UE may be transmitted and received repeatedly, like a common control signal and/or data for an MTC UE. For the technical features of the method of repeated transmissions/receptions for an NB-IoT UE, the embodiments described in clause 2 to clause 3.8 may be applied.

If step S1510 is not performed in FIG. 15, the NB-IoT UE may search for a bandwidth allocated to it based on predetermined resource allocation information (i.e., VRB index information) as listed in [Table 17]. Further, the NB-IoT UE may receive common control information or data in the detected bandwidth.

4. Apparatuses

Figure 16:
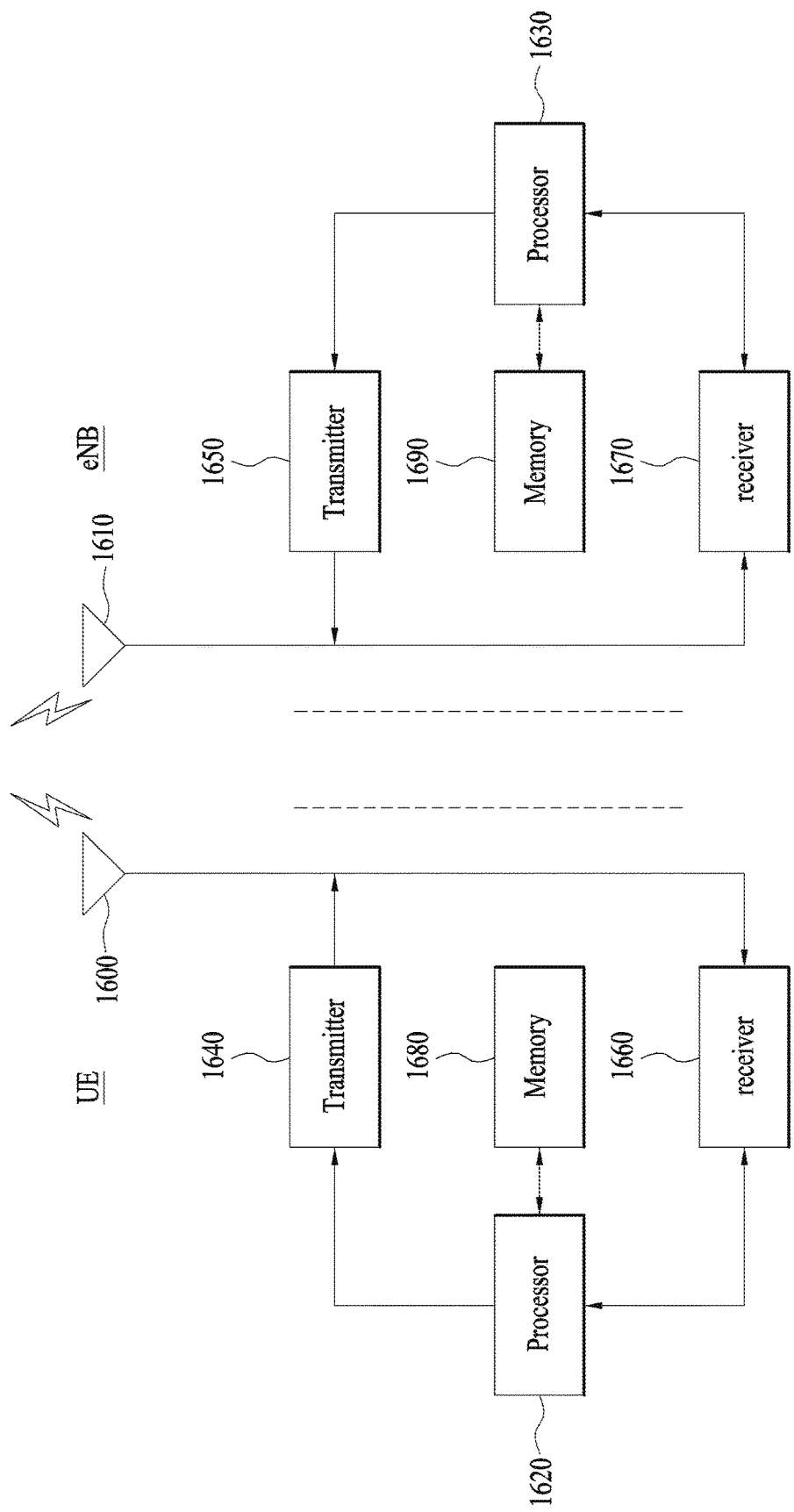
FIG. 16 is a block diagram of apparatuses for performing the methods described in FIGS. 1 to 13.

Apparatuses illustrated in FIG. 16 are means that can implement the methods described before with reference to FIGS. 1 to 15.

A UE may act as a transmission end on a UL and as a reception end on a DL. An eNB may act as a reception end on a UL and as a transmission end on a DL.

That is, each of the UE and the eNB may include a Transmitter (Tx) 1640 or 1650 and a Receiver (Rx) 1660 or 1670, for controlling transmission and reception of information, data, and/or messages, and an antenna 1600 or 1610 for transmitting and receiving information, data, and/or messages.

Each of the UE and the eNB may further include a processor 1620 or 1630 for implementing the afore-described embodiments of the present disclosure and a memory 1680 or 1690 for temporarily or permanently storing operations of the processor 1620 or 1630.

The embodiments of the present disclosure may be implemented using the components and functions of the above-described UE and eNB. For example, the processor of the eNB may configure a resource area to be allocated to an NB-IoT system. Herein, with a VRB corresponding to a DVRB that may affect center 6 RBs avoided, a PRB that minimizes the difference (i.e., frequency offset) between a center frequency and a PRB center frequency according to the bandwidth of a legacy system may be allocated as an NB-IoT band. The processor of the eNB may transmit common control information or data to an NB-IoT UE in a VRB mapped to the PRB allocated as the NB-IoT band. For details, refer to clause 1 to clause 3.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1680 or 1690 and executed by the processor 1620 or 1630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for transmitting a common control message in a wireless access system supporting Narrow Band Internet of Things (NB-IoT), the method comprising:
    allocating a bandwidth for the NB-IoT; and
    transmitting the common control message in the allocated bandwidth,
    wherein the bandwidth for the NB-IoT is allocated to be aligned with a boundary of a Physical Resource Block (PRB) used in a legacy system,
    wherein a PRB which minimizes an offset between a center frequency of the bandwidth for the NB-IoT and a center frequency of the PRB used in the legacy system is allocated as the bandwidth for the NB-IoT, in consideration of a bandwidth of the legacy system,
    wherein the offset has a non-zero value, and the center frequency of the bandwidth for the NB-IoT is not equal to the center frequency of the PRB used in the legacy system, and
    wherein the PRB allocated as the bandwidth for the NB-IoT is not used as a Distributed Virtual Resource Block (DVRB) in the legacy system.

2. The method according to claim 1, wherein Virtual Resource Blocks (VRBs) which are mapped to the PRB allocated as the bandwidth for the NB-IoT are used for the transmission of the common control message.

3. The method according to claim 1, wherein the bandwidth for the NB-IoT is allocated other than a VRB affecting center 6 RBs of the legacy system.

4. The method according to claim 1, wherein the common control message is transmitted repeatedly a predetermined number of times.

5. An apparatus for transmitting a common control message in a wireless access system supporting Narrow Band Internet of Things (NB-IoT), the method comprising:
    a transmitter; and
    a processor for supporting transmission of the common control message,
    wherein the processor allocates a bandwidth for the NB-IoT, and transmits the common control message in the allocated bandwidth by controlling the transmitter,
    wherein the bandwidth for the NB-IoT is allocated to be aligned with a boundary of a Physical Resource Block (PRB) used in a legacy system,
    wherein a PRB which minimizes an offset between a center frequency of the bandwidth for the NB-IoT and a center frequency of the PRB used in the legacy system is allocated as the bandwidth for the NB-IoT, in consideration of a bandwidth of the legacy system,
    wherein the offset has a non-zero value, and the center frequency of the bandwidth for the NB-IoT is not equal to the center frequency of the PRB used in the legacy system, and
    wherein the PRB allocated as the bandwidth for the NB-IoT is not used as a Distributed Virtual Resource Block (DVRB) in the legacy system.

6. The apparatus according to claim 5, wherein Virtual Resource Blocks (VRBs) which are mapped to the PRB allocated as the bandwidth for the NB-IoT are used for the transmission of the common control message.

7. The apparatus according to claim 5, wherein the bandwidth for the NB-IoT is allocated other than a VRB affecting center 6 RBs of the legacy system.

8. The apparatus according to claim 5, wherein the common control message is transmitted repeatedly a predetermined number of times.

* * * * *

UNITED STATES PATENT AND TRADEMARK OFFICE
CERTIFICATE OF CORRECTION

PATENT NO. : 10,484,127 B2  
APPLICATION NO. : 15/545458  
DATED : November 19, 2019  
INVENTOR(S) : Bonghoe Kim et al.

Page 1 of 1

It is certified that error appears in the above-identified patent and that said Letters Patent is hereby corrected as shown below:

On the Title Page

Item (54) and in the Specification, Column 1, Lines 1-5, please change the title from:
"METHOD AND APPARATUS FOR TRANCEIVING COMMON CONTROL MESSAGE IN WIRELESS ACCESS SYSTEM SUPPORTING NARROW BAND INTERNET OF THINGS"

To:
--METHOD AND APPARATUS FOR TRANSCEIVING COMMON CONTROL MESSAGE IN WIRELESS ACCESS SYSTEM SUPPORTING NARROW BAND INTERNET OF THINGS--.

Signed and Sealed this  
Fourth Day of February, 2020

Andrei Iancu  
*Director of the United States Patent and Trademark Office*